United States Patent
Sasidharan Pillai

(10) Patent No.: US 9,025,442 B2
(45) Date of Patent: May 5, 2015

(54) PSEUDO WIRE END-TO-END REDUNDANCY SETUP OVER DISJOINT MPLS TRANSPORT PATHS

(71) Applicant: Telefonaktiebolaget L M Ericsson (publ), Stockholm (SE)

(72) Inventor: Kiran Sasidharan Pillai, San Jose, CA (US)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 124 days.

(21) Appl. No.: 13/906,682

(22) Filed: May 31, 2013

(65) Prior Publication Data

US 2014/0355419 A1    Dec. 4, 2014

(51) Int. Cl.
| | | |
|---|---|---|
| G01R 31/08 | (2006.01) | |
| H04L 12/24 | (2006.01) | |
| H04L 12/723 | (2013.01) | |
| H04L 12/707 | (2013.01) | |
| H04L 12/703 | (2013.01) | |

(52) U.S. Cl.
CPC ............ *H04L 41/0654* (2013.01); *H04L 45/50* (2013.01); *H04L 45/22* (2013.01); *H04L 45/28* (2013.01)

(58) Field of Classification Search
CPC ..... H04L 41/0654; H04L 45/50; H04L 45/22; H04L 45/28
See application file for complete search history.

(56) References Cited

U.S. PATENT DOCUMENTS

| 7,436,782 B2 | 10/2008 | Ngo et al. |
| 7,940,695 B1 | 5/2011 | Bahadur et al. |
| 2006/0182122 A1* | 8/2006 | Davie et al. .............. 370/395.53 |
| 2010/0098088 A1 | 4/2010 | Hirota |
| 2012/0047737 A1 | 3/2012 | Ishida et al. |
| 2012/0236868 A1* | 9/2012 | Yan .......................... 370/395.53 |
| 2013/0235888 A1* | 9/2013 | Bui et al. ...................... 370/503 |
| 2013/0286890 A1* | 10/2013 | Chen et al. ................... 370/254 |

FOREIGN PATENT DOCUMENTS

| EP | 2242215 | 10/2010 |
| WO | WO 2012/092824 A1 | 7/2012 |

OTHER PUBLICATIONS

Andersson, et al., "LDP Specification", Network Working Group, Request for Comments (RFC) 3036, The Internet Society, Jan. 2001 (http://tools.ietf.org/html/rfc3036), 132 pages.

(Continued)

*Primary Examiner* — David Oveissi
(74) *Attorney, Agent, or Firm* — Blakely Sokoloff Taylor Zafman LLP

(57) ABSTRACT

According to one embodiment, a method for establishing a primary and redundant PW over disjoint bidirectional RSVP-TE LSPs include establishing a first bidirectional RSVP-TE LSP that includes a first upstream path and a first downstream path. The method includes transmitting a first label distribution protocol (LDP) label mapping message that includes a first transport path include field that causes the second PE router to use the first downstream path for the primary PW. The method includes establishing a second bidirectional RSVP-TE LSP that includes a second upstream path and a second downstream path. The method includes transmitting a second LDP label mapping message that includes a second transport path include field that causes the second PE router to use the second downstream path for the redundant PW.

22 Claims, 18 Drawing Sheets

(56) References Cited

OTHER PUBLICATIONS

Kompella, et al., "Virtual Private LAN Service (VPLS) Using BGP for Auto-Discovery and Signaling", Network Working Group, Request for Comments (RFC) 4761, The IETF Trust, Jan. 2007 (http://tools.ietf.org/html/rfc4761), 28 pages.

Lasserre, et al., "Virtual Private LAN Service (VPLS) Using Label Distribution Protocol (LDP) Signaling", Network Working Group, Request for Comments (RFC) 4762, The IETF Trust, Jan. 2007 (http://tools.ietf.org/pdf/rfc4762.pdf), 31 pages.

Muley, et al., "Preferential Forwarding Status Bit Definition", Network Working Group, Internet Draft, Feb. 25, 2008 (expires Aug. 25, 2008); draft-ietf-pwe3-redundancy-bit-00.txt; 26 pages.

Muley, et al., "Pseudowire (PW) Redundancy", Network Working Group, Internet Draft, Intended Status: Informational; arch 28, 2008 (expires Aug. 28, 2008); draft-ietf-pwe3-redundancy-00.txt; 13 pages.

Bocci, et al., "A Framework for MPLS in Transport Networks", *IETF RFC 5921*, (Jul. 2010), 56 pages.

Bocci, et al., "Network high availability for ethernet services using IP/MPLS networks", *Communications Magazine, IEEE*, vol. 46, Issue: 3, (Mar. 2008), pp. 90-96.

Martini, et al., "Pseudowire Setup and Maintenance using the Label Distribution Protocol", draft-ietf-pwe3-control-protocol-17.txt, *Network Working Group, Internet Engineering Task Force (IETF), The Internet Society*, (Jun. 2005), 35 pages.

Muley, et al., "Pseudowire (PW) Redundancy", draft-muley-pwe3-redundancy-02.txt, *The IETF Trust*, (Nov. 19, 2007), 16 pages.

Jeganathan, et al., "RSVP-TE LSP egress fast-protection", Network Working Group, Internet-Draft, IETF, draft-minto-rsvp-lsp-egress-fast-protection-02, (Apr. 26, 2013), 14 pages.

Kini, et al., "Fast Re-route using extensions to LDP", Network Working Group Internet-Draft, IETF Trust, draft-kini-mpls-frr-ldp-03, (Jul. 16, 2012), 16 pages.

Muley, et al., "Preferential Forwarding Status bit definition", Network Working Group, Internet Draft, draft-muley-dutta-pwe3-redundancy-bit-02.txt, (Nov. 19, 2007), 17 pages.

Pan, et al., "Pseudo Wire Protection", PWE3 Working Group Internet Draft, The Internet Society, draft-pan-pwe3-protection-03.txt, (Jul. 31, 2006), 20 pages.

\* cited by examiner

PSEUDO WIRE END-TO-END REDUNDANCY SETUP OVER DISJOINT MPLS TRANSPORT PATHS

FIELD OF THE INVENTION

Embodiments of the present invention relate generally to packet networks. More particularly, this invention relates to establishing primary and redundant pseudo wires over disjoint multiprotocol label switched (MPLS) transport paths.

BACKGROUND

Layer 2 Virtual Private Network (L2VPN) and Virtual Private Local Area Network Service (VPLS) services allow customer sites that are geographically dispersed to share an Ethernet broadcast domain by connecting the sites through pseudo wires, which emulate the transaction of a "wire" connecting the customer sites. These pseudo wires are commonly known as Virtual Leased Lines (VLLs). Under the pseudo wire end to end emulation (PWE3) model, a customer uses native format (i.e., original traffic type) attachment circuits to connect to a service provider's provider edge (PE) routers. To transport data from one customer site to another over a Multiprotocol Label Switched (MPLS) network, a MPLS Label Switched Path (LSP) transport path is established between the PE routers using the Resource Reservation Protocol-Traffic Engineering (RSVP-TE) protocol or Label Distribution Protocol (LDP) protocol. These MPLS LSPs, however, are transparent to the customer. From the customer's perspective, the pseudo wire acts as a wire connecting the customer's sites, and traffic is exchanged between the sites using the customer's native/original traffic type.

To achieve resiliency of VLL services, more than one pseudo wire (typically, two) are configured to provide redundancy of L2VPN/VPLS services. Among the redundant pseudo wires, only one pseudo wire will be active and all other redundant pseudo wires are in standby state. The MPLS transport path used by these redundant pseudo wires, however, could share one or more same physical links between the PE routers. In cases where redundant pseudo wires do share one or more same physical link, the redundant pseudo wires could share the same fate or risk of failure. In other words, if there is a failure in one of these shared links, the result will be a total loss of the VLL services, even though redundant pseudo wires have been established for the VLL services.

SUMMARY

Exemplary methods, apparatuses, and systems for establishing a primary and redundant PW over disjoint bidirectional RSVP-TE LSPs include establishing a first bidirectional RSVP-TE LSP, wherein the first bidirectional RSVP-TE LSP includes a first upstream path for transporting traffic from the first PE router to the second PE router, and a first downstream path for transporting traffic from the second PE router to the first PE router. In one embodiment, the exemplary methods, apparatuses, and systems include transmitting a first label distribution protocol (LDP) label mapping message to the second PE router, wherein the first LDP label mapping message includes a first transport path include field that causes the second PE router to use the first downstream path for the primary PW. In one embodiment, the exemplary methods, apparatuses, and systems further include establishing a second bidirectional RSVP-TE LSP, wherein the second bidirectional RSVP-TE LSP includes a second upstream path for transporting network traffic from the first PE router to the second PE router, and a second downstream path for transporting network traffic from the second PE router to the first PE router, wherein the second bidirectional RSVP-TE LSP and the first bidirectional RSVP-TE LSP are disjoint RSVP-TE LSP. In one embodiment, the exemplary methods, apparatuses, and systems further include transmitting a second LDP label mapping message to the second PE router, and wherein the second LDP label mapping message includes a second transport path include field that causes the second PE router to use the second downstream path for the redundant PW.

Exemplary methods, apparatuses, and systems for establishing a primary and redundant PW over disjoint unidirectional RSVP-TE LSPs include transmitting a first RSVP-TE path message to establish a first upstream unidirectional RSVP-TE LSP for transporting network traffic from the first PE router to the second PE router. In one embodiment, the exemplary methods, apparatuses, and systems include transmitting a first label distribution protocol (LDP) label mapping message to the second PE router. In one embodiment, the exemplary methods, apparatuses, and systems include receiving a second RSVP-TE path message from the second PE router, the second RSVP-TE path message establishing a first downstream unidirectional RSVP-TE LSP for transporting network traffic from the second PE router to the first PE router. In one embodiment, the exemplary methods, apparatuses, and systems include receiving a second LDP label mapping message from the second PE router. In one embodiment, the exemplary methods, apparatuses, and systems further include transmitting a third RSVP-TE path message to establish a second upstream unidirectional RSVP-TE LSP for transporting network traffic from the first PE router to the second PE router, wherein the second upstream unidirectional RSVP-TE LSP is disjoint from both the first upstream and the first downstream unidirectional RSVP-TE LSPs. In at least one embodiment, the exemplary methods, apparatuses, and systems include transmitting a third LDP label mapping message to the second PE router, wherein the third LDP label mapping message includes a third transport SRLG include field, and a third transport SRLG exclude field, wherein the third transport SRLG include field and the third transport SRLG exclude field contain information that cause the second PE router to establish a second downstream unidirectional RSVP-TE LSP that is disjoint from both the first upstream and the first downstream unidirectional RSVP-TE LSPs.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Figure 1:
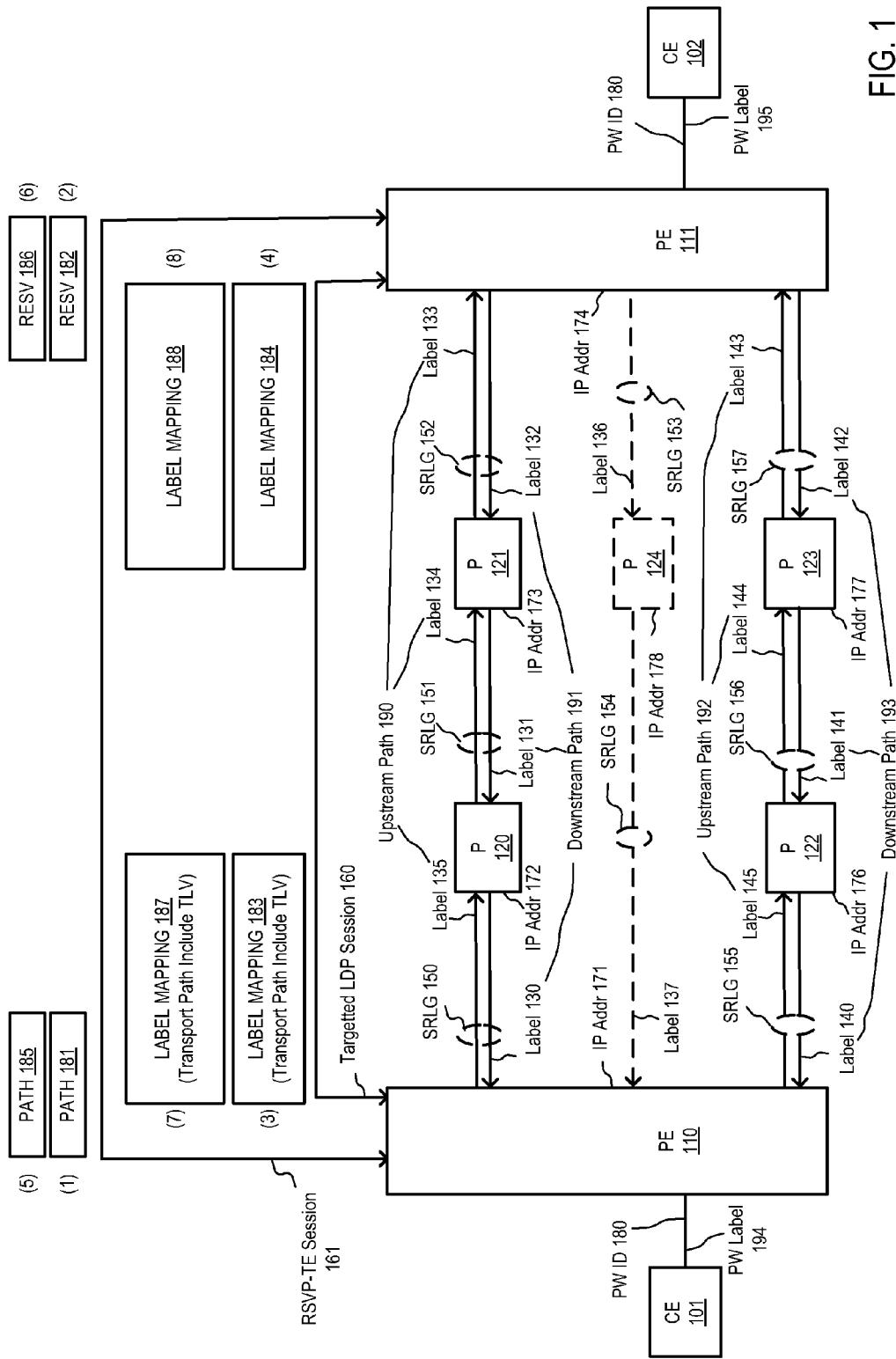
FIG. 1 is a block diagram illustrating a VPLS network according to one embodiment.

In the following description, numerous specific details are set forth. However, it is understood that embodiments of the invention may be practiced without these specific details. In other instances, well-known circuits, structures and techniques have not been shown in detail in order not to obscure the understanding of this description.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

As used herein, a network device (e.g., a router, switch, bridge) is a piece of networking equipment, including hardware and software, which communicatively interconnects other equipment on the network (e.g., other network devices, end stations). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video). Subscriber end stations (e.g., servers, workstations, laptops, netbooks, palm tops, mobile phones, smartphones, multimedia phones, Voice Over Internet Protocol (VoIP) phones, user equipment, terminals, portable media players, GPS units, gaming systems, set-top boxes) access content/services provided over the Internet and/or content/services provided on virtual private networks (VPNs) overlaid on (e.g., tunneled through) the Internet. The content and/or services are typically provided by one or more end stations (e.g., server end stations) belonging to a service or content provider or end stations participating in a peer-to-peer (P2P) service, and may include, for example, public webpages (e.g., free content, store fronts, search services), private webpages (e.g., username/password accessed webpages providing email services), and/or corporate networks over VPNs. Typically, subscriber end stations are coupled (e.g., through customer premise equipment coupled to an access network (wired or wirelessly)) to edge network devices, which are coupled (e.g., through one or more core network devices) to other edge network devices, which are coupled to other end stations (e.g., server end stations).

Some network devices provide support for implementing VPNs (Virtual Private Networks) (e.g., Layer 2 VPNs and/or Layer 3 VPNs). For example, the network device where a provider's network and a customer's network are coupled are respectively referred to as PEs (Provider Edge) and CEs (Customer Edge). In a Layer 2 VPN, forwarding typically is performed on the CE(s) on either end of the VPN and traffic is sent across the network (e.g., through one or more PEs coupled by other network devices). Layer 2 circuits are configured between the CEs and PEs (e.g., an Ethernet port, an ATM permanent virtual circuit (PVC), a Frame Relay PVC). In a Layer 3 VPN, routing typically is performed by the PEs. By way of example, an edge network device that supports multiple contexts may be deployed as a PE; and a context may be configured with a VPN protocol, and thus that context is referred as a VPN context.

Some network devices provide support for VPLS (Virtual Private LAN Service) (RFC 4761 and 4762). For example, in a VPLS network, subscriber end stations access content/services provided through the VPLS network by coupling to CEs, which are coupled through PEs coupled by other network devices. VPLS networks can be used for implementing triple play network applications (e.g., data applications (e.g., high-speed Internet access), video applications (e.g., television service such as IPTV (Internet Protocol Television), VoD (Video-on-Demand) service), and voice applications (e.g., VoIP (Voice over Internet Protocol) service)), VPN services, etc. VPLS is a type of layer 2 VPN that can be used for multi-point connectivity. VPLS networks also allow subscriber end stations that are coupled with CEs at separate geographical locations to communicate with each other across a Wide Area Network (WAN) as if they were directly attached to each other in a Local Area Network (LAN) (referred to as an emulated LAN).

In VPLS networks, each CE typically attaches, possibly through an access network (wired and/or wireless), to a bridge module of a PE via an attachment circuit (e.g., a virtual link or connection between the CE and the PE). The bridge module of the PE attaches to an emulated LAN through an emulated LAN interface. Each bridge module acts as a "Virtual Switch Instance" (VSI) by maintaining a forwarding table that maps MAC addresses to pseudowires and attachment circuits. PEs forward frames (received from CEs) to destinations (e.g., other CEs, other PEs) based on the MAC destination address field included in those frames.

As used herein, a network interface may be physical or virtual; and an interface address is an IP address assigned to a network interface, be it a physical network interface or virtual network interface. A physical network interface is hardware in a network device through which a network connection is made (e.g., wirelessly through a wireless network interface controller (WNIC) or through plugging in a cable to a port connected to a network interface controller (NIC)). Typically, a network device has multiple physical network interfaces. A virtual network interface may be associated with a physical network interface, with another virtual interface, or stand on its own (e.g., a loopback interface, a point to point protocol interface). A network interface (physical or virtual) may be numbered (a network interface with an IP address) or unnumbered (an network interface without an IP address). A loopback interface (and its loopback address) is a specific type of virtual network interface (and IP address) of a node (physical or virtual) often used for management purposes; where such an IP address is referred to as the nodal loopback address. The IP address(es) assigned to the network interface(s) of a network device, are referred to as IP addresses of that network device; at a more granular level, the IP address(es) assigned to network interface(s) assigned to a node implemented on a network device, can be referred to as IP addresses of that node.

Throughout the description, pseudo wires (PWs) are discussed in the context of VPLS networks. It will be appreciated, however, that the mechanisms discussed herein are equally applicable to other types of VPNs, e.g., L2VPNs. FIG. 1 is a block diagram illustrating VPLS network 100. VPLS network 100 includes Customer Edge (CE) network devices 101-102. A CE network device is a type of edge network device located at a customer premise. CE network devices 101-102 are communicatively coupled to Provider Edge (PE) network devices 110-111, respectively, via attachment circuits. VPLS network 100 also includes a plurality of Provider (P) network devices, e.g., P network devices 120-124, communicatively coupled to PE network devices 110-111. As illustrated in FIG. 1, PE 110 has been assigned Internet Protocol (IP) Address 171; PE 111 has been assigned IP Address 174; P 120 has been assigned IP Address 172; P 121 has been assigned IP Address 173; P 122 has been assigned IP Address 176; P 123 has been assigned IP Address 177; and P 124 has been assigned IP Address 178.

One or more physical links exists between the network devices. For example, PE 110 and P 120 are coupled by physical links having labels 130 and 135; P 120 and P 121 are coupled by physical links having labels 131 and 134; P 121 and PE 111 are coupled by physical links having labels 132 and 133; PE 110 and P 122 are coupled by physical links having labels 140 and 145; P 122 and P 123 are coupled by physical links having labels 141 and 144; P 123 and PE 111 are coupled by physical links having labels 142 and 143; PE 110 and P 124 are coupled by a physical link having label 137; and P 124 and PE 111 are coupled by a physical link having label 136.

Physical links that couple a set of two same network devices belong to the same Shared Risk Link Group (SRLG). For example, physical links having labels 130 and 135 belong to SRLG 150; physical links having labels 131 and 134 belong to SRLG 151; physical links having labels 132 and 133 belong to SRLG 152; physical links having labels 140 and 145 belong to SRLG 155; physical links having labels 141 and 144 belong to SRLG 156; physical links having labels 142 and 143 belong to SRLG 157; physical link having label 137 belongs to SRLG 154; and physical link having label 136 belongs to SRLG 153.

FIG. 1 illustrates that RSVP-TE session 161 and targeted LDP session 160 have been setup between PE 110 and 111. The messages for these sessions may be transported via the physical links described above. In order to establish PWs, the first step is to establish MPLS transport LSPs. The RSVP-TE protocol can be used to establish MPLS transport LSPs when there are traffic engineering requirements. RSPV-TE can be used in either bidirectional or unidirectional mode. Throughout the description, PE 110 may sometimes be referred to as a hub router or ingress router, which is responsible for establishing the primary and redundant PWs. PE 111 will sometimes be referred to as a peer PE router or egress router, which is responsible for acting in concert with the hub router in order to ensure that the primary and redundant PWs are using disjoint MPLS transport LSPs.

As used herein, disjoint MPLS transport LSPs means that the primary PW transport path and the redundant PW transport path do not have any SRLG in common. Throughout the description, references are made to upstream and downstream paths. As used herein, an upstream path refers to a MPLS transport path originating from the ingress router (PE 110) and terminating at the egress router (PE 111). A downstream path refers to a MPLS transport path originating from the egress router and terminating at the ingress router.

FIG. 1 assumes that a PW having a PW ID 180 has been requested, e.g., by a system administrator, to be established between CE 101 and CE 102. Thus, references to the PW will be understood as the PW identified by PW ID 180. The PW is required to be setup with redundancy, using the mechanisms described in draft-muley-pwe3-redundancy provided by the Internet Engineering Task Force (IETF), which is hereby incorporated by reference. In the embodiment illustrated in FIG. 1, the PW set up request is for the primary and redundant PWs to be established over disjoint MPLS LSPs, which has advantages over a conventional redundant PW as described in draft-muley-pwe3-redundancy. Throughout the description, references are made to a primary and a redundant PW. It will be understood that a primary PW is simply a PW that is in active mode (i.e., used for transporting network traffic). A redundant PW is simply a PW that is in backup mode (i.e., not used for transporting network traffic). A hub router (i.e., a PE responsible for setting up a PW) provides the signaling to configure a PW as either primary or redundant, as described in draft-ietf-pwe3-redundancy-bit provided by the IETF, which is hereby incorporated by reference.

Referring now to FIG. 1. In response to the request for a PW to be setup, PE 110 determines an upstream MPLS transport path. In this illustration, it is assumed that PE 110 has determined that the upstream path should include P 120, P 121, and ultimately PE 111. This is denoted as upstream path 190. Accordingly, at (1), PE 110 transmits RSVP-TE path message 181 to P 120. PE 110 inserts its label 130 in RSVP-TE path message 181. As RSVP-TE path message 181 propagates through the network, P 120 inserts its label 131, and P 121 inserts its label 132. Labels 130-132 identify a potential reverse (downstream) path from PE 111 to PE 110.

In one embodiment, RSVP-TE path message 181 may be configured such that it causes PE 111 to use the same upstream path SRLGs (i.e., SRLG 150-152) for the corresponding downstream path. In such an embodiment, PE 111 is required to set up a reverse (downstream) transport path that includes P 121, P 120, and ultimately PE 110. In an alternate embodiment, RSVP-TE path message 181 may be configured such that it does not require PE 111 to use the same upstream path SRLGs for the downstream path. In such an embodiment, PE 111 may choose to include in the downstream path P 124 and ultimately PE 110 (i.e., SRLGs 153-154). In this example, it is assumed PE 111 has chosen to set up the downstream path that includes P 121, P 120, and ultimately PE 110 (i.e., using SRLGs 150-152). This downstream path is denoted as downstream path 191.

At (2), PE 111 transmits back to PE 110 RSVP-TE resv message 182. PE 111 inserts its label 133 in RSVP-TE resv message 182. As RSVP-TE resv message 182 propagates through the network, P 121 inserts its label 134, and P 120 inserts its label 135. At this point, a first bidirectional RSVP-TE LSP is set up. This first bidirectional RSVP-TE LSP includes upstream path 190 having physical links identified by labels 135, 134, and 133. The first bidirectional RSVP-TE LSP also includes downstream path 191 having physical links identified by labels 132, 131, and 130.

At (3), PE 110 binds upstream path 190 to the primary PW by transmitting LDP label mapping message 183 to PE 111. Conventionally, a LDP label mapping message from a hub router only binds the upstream path of the primary PW to an upstream RSVP-TE LSP (e.g., upstream path 190). In a conventional PW set up, PE 111 is not required to bind the downstream path of the primary PW to downstream path 191. Instead, PE 111 may, under a conventional architecture, choose to establish a different RSVP-TE LSP for the downstream path of the primary PW. This is problematic because it prevents a hub router (such as PE 110) from establishing primary and redundant PWs that use disjoint LSPs since the hub router does not have control over which LSP is used by the egress router.

In one embodiment, LDP label mapping message 183 includes a Transport Path Include type length value (TLV) field to overcome the above limitation associated with the conventional LDP label mapping message. The Transport Path Include TLV identifies a particular bidirectional RSVP-TE LSP and PW, and causes the egress router to bind the downstream path of the identified PW to the downstream path of the identified bidirectional RSVP-TE LSP. In this example, the Transport Path Include TLV causes PE 111 to bind the downstream path of the primary PW to downstream path 191. The Transport Path Include TLV is described in further details below.

In response to receiving LDP label mapping message 183, at (4), PE 111 binds the downstream path of the primary PW to downstream path 191, by transmitting LDP label mapping message 184 to PE 110. By transmitting message 184, PE 111 advertises its PW label 195 for the PW identified by PW ID 180. At this point, the primary PW is established. The primary PW includes the MPLS transport path comprising of upstream path 190 and downstream path 191.

Next, PE 110 establishes a redundant PW by first establishing a second bidirectional RSVP-TE LSP. PE 110 determines an upstream MPLS transport path for the second bidirectional RSVP-TE LSP. In this illustration, it is assumed that PE 110 has determined that the upstream path should include P 122, P 123, and ultimately PE 111. This is denoted as upstream path 192. Accordingly, at (5), PE 110 transmits RSVP-TE path message 185 to P 122. PE 110 inserts its label 140 in path message 185. As path message 185 propagates through the network, P 122 inserts its label 141, and P 123 inserts its label 142. Labels 140-142 identify a reverse (downstream) path from PE 111 to PE 110.

In one embodiment, RSVP-TE path message 185 is configured such that it causes PE 111 to use the same upstream path SRLGs (i.e., SRLG 155-157) for the corresponding downstream path. In such an embodiment, PE 111 is required to set up a reverse (downstream) transport path that includes P 122, P 123, and ultimately PE 110 (i.e., using SRLGs 155-157). This downstream path is denoted as downstream path 193.

At (6), PE 111 transmits back to PE 110 RSVP-TE resv message 186. PE 111 inserts its label 143 in RSVP-TE resv message 186. As RSVP-TE resv message 186 propagates through the network, P 123 inserts its label 144, and P 122 inserts its label 145. At this point, the second bidirectional RSVP-TE LSP is established. This second bidirectional RSVP-TE LSP includes upstream path 192 having physical links identified by labels 145, 144, and 143. The second bidirectional RSVP-TE LSP also includes downstream path 193 having physical links identified by labels 142, 141, and 140.

At (7), PE 110 binds upstream path 192 to the redundant PW and transmits LDP label mapping message 187 to PE 111. As discussed above, conventionally, a LDP label mapping message from an ingress/hub router only binds the upstream path of the primary PW to an upstream RSVP-TE LSP (e.g., upstream path 192). In a conventional PW set up, PE 111 is not required to bind the downstream path of the primary PW to downstream path 193. Instead, PE 111 may, under a conventional architecture, choose to establish a different RSVP-TE LSP for the downstream path of the redundant PW. This is problematic because it prevents a hub router (such as PE 110) from establishing primary and redundant PWs that use disjoint LSPs since the hub router does not have control over which LSP is used by the egress router.

In one embodiment, LDP label mapping message 187 includes a Transport Path Include TLV field to overcome the above limitation associated with the conventional LDP label mapping message. The Transport Path Include TLV identifies a particular bidirectional RSVP-TE LSP and PW, and causes the egress router to bind the downstream path of the identified PW to the downstream path of the identified bidirectional RSVP-TE LSP. In this example, the Transport Path Include TLV causes PE 111 to bind the downstream path of the redundant PW to downstream path 193. The Transport Path Include TLV is described in further details below.

In response to receiving LDP label mapping message 187, at (8), PE 111 binds the downstream path of the redundant PW to downstream path 193, and transmits LDP label mapping message 188 to PE 110. By transmitting message 188, PE 111 advertises its PW label 195 for the PW identified by PW ID 180. At this point, the redundant PW is established. The redundant PW includes the MPLS transport path comprising of upstream path 192 and downstream path 193.

The mechanism described above has advantages over a conventional mechanism for establishing a PW with redundancy because the primary and redundant PWs (as established by the present mechanism) use disjoint MPLS transport paths. This prevents any possibility of a single link failure from causing both the primary and redundant PW to go down (i.e., fail).

Figure 2:
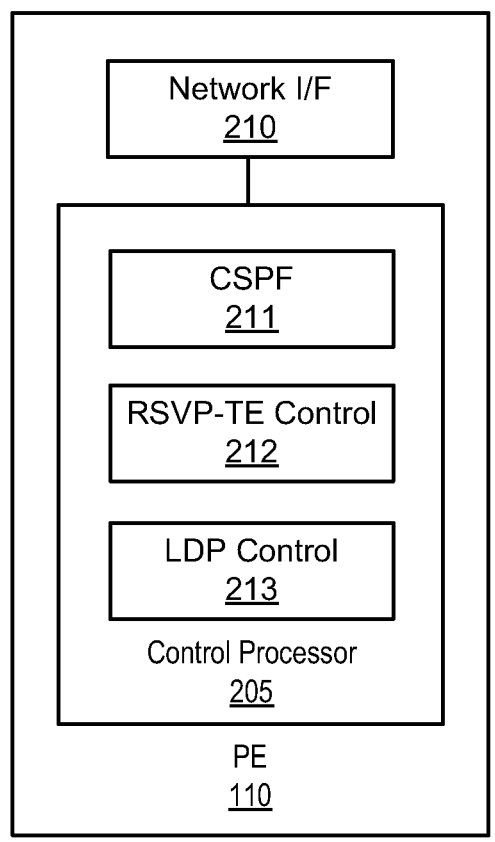
FIG. 2 is a block diagram illustrating a provider edge router according to one embodiment.

FIG. 2 is a block diagram illustrating PE 110 according to one embodiment. PE 110 includes network interface 210 for receiving and transmitting network traffic, e.g., network traffic associated with targeted LDP session 160 and RSVP-TE session 161. PE 110 further includes control processor 205, which can be implemented in software, firmware, hardware, or any combination thereof. In one embodiment, control processor 205 includes Constrained Shortest Path First (CSPF) 211, RSVP-TE control 212, and LDP control 213.

In one embodiment, RSVP-TE control 212 is configured to establish and maintain RSVP-TE sessions with peer network devices. RSVP-TE control 212 is configured to transmit and receive RSVP-TE messages that establish and maintain RSVP-TE LSPs. In one embodiment, LDP control 213 is configured to establish and maintain LDP sessions with peer network devices. LDP control 213 is configured to transmit and receive LDP messages that bind PWs to RSVP-TE LSPs. In one embodiment, CSPF 211 is configured to provide RSVP-TE control 212 and/or LDP control 213 with information for establishing MPLS transport paths. Details of the various modules of PE 110 shall become apparent through the discussion of other figures below.

Figure 3:
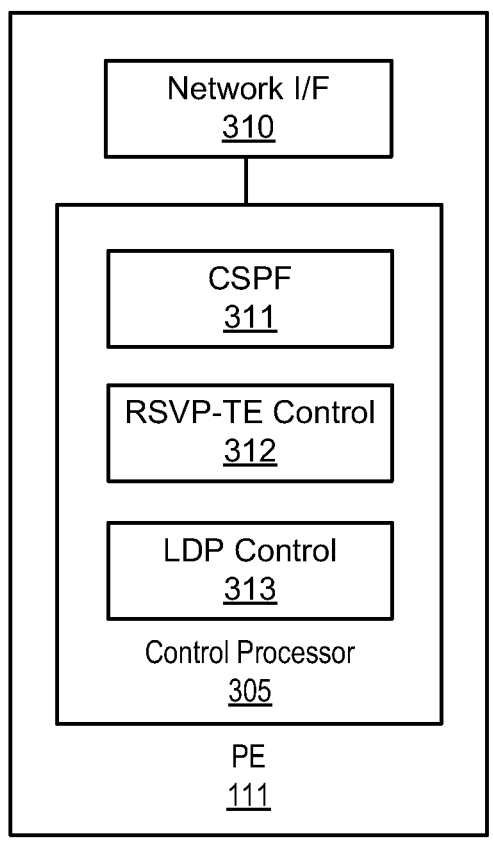
FIG. 3 is a block diagram illustrating a provider edge router according to one embodiment.

FIG. 3 is a block diagram illustrating PE 111 according to one embodiment. PE 111 includes network interface 310 for receiving and transmitting network traffic, e.g., network traffic associated with targeted LDP session 160 and RSVP-TE session 161. PE 111 further includes control processor 305, which can be implemented in software, firmware, hardware, or any combination thereof. In one embodiment, control processor 305 includes Constrained Shortest Path First (CSPF) 311, RSVP-TE control 312, and LDP control 313.

In one embodiment, RSVP-TE control 312 is configured to establish and maintain RSVP-TE sessions with peer network devices. RSVP-TE control 312 is configured to transmit and receive RSVP-TE messages that establish and maintain RSVP-TE LSPs. In one embodiment, LDP control 313 is configured to establish and maintain LDP sessions with peer network devices. LDP control 313 is configured to transmit and receive LDP messages that bind PWs to RSVP-TE LSPs. In one embodiment, CSPF 311 is configured to provide RSVP-TE control 312 and/or LDP control 313 with information for establishing MPLS transport paths. Details of the various modules of PE 111 shall become apparent through the discussion of other figures below.

Figure 4:
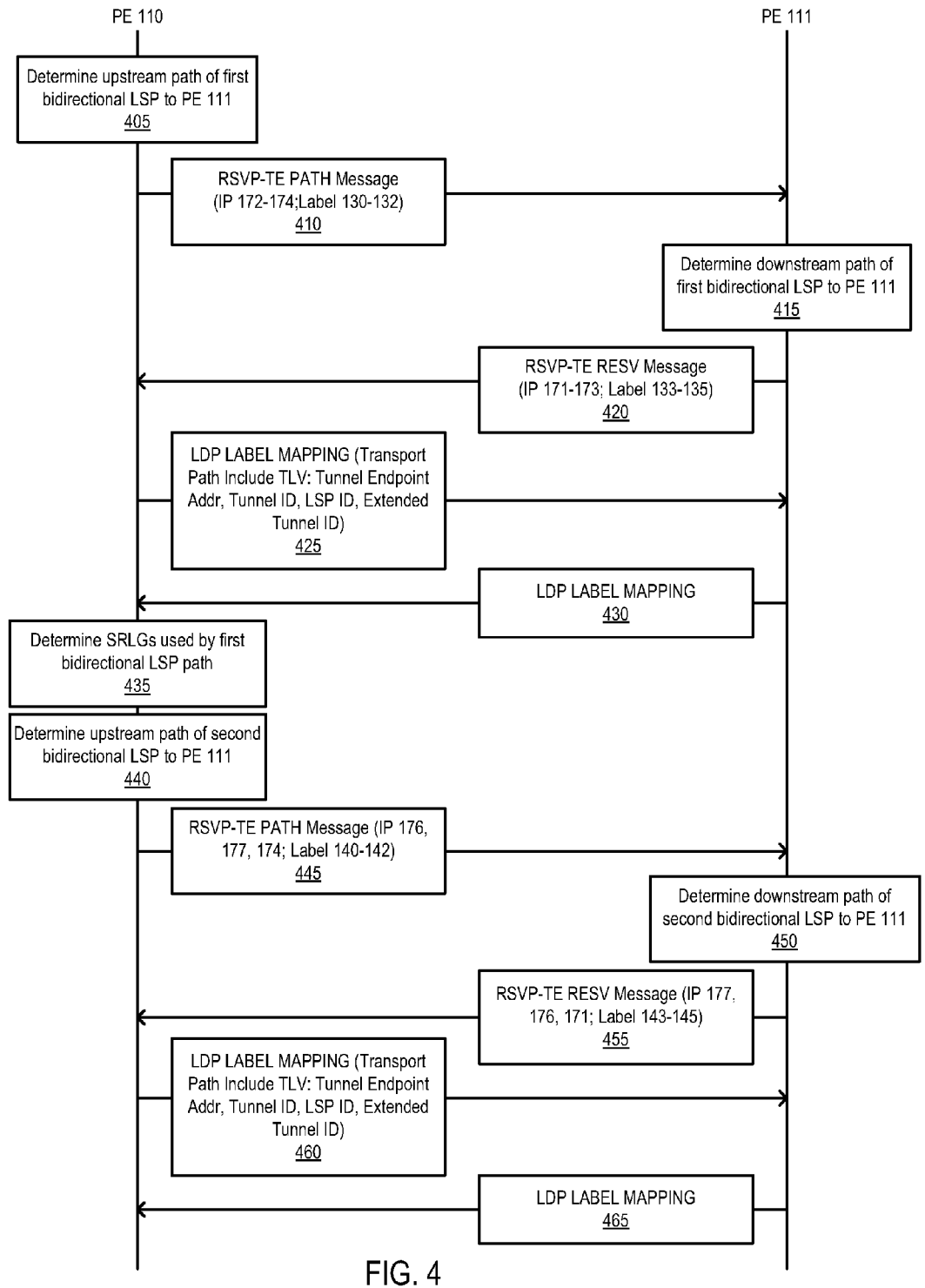
FIG. 4 is a transaction diagram illustrating a process flow for establishing a primary and redundant PW over disjoint bidirectional RSVP-TE LSPs according to one embodiment.

FIG. 4 is a transaction diagram illustrating process flow 400 for establishing primary and redundant PWs that use disjoint bidirectional RSVP-TE LSPs. Process flow 400 assumes that PE 110 has received a request (e.g., from a system administrator) to establish a PW with redundancy. Process flow 400 is discussed with reference to FIGS. 1-3. At transaction 405, PE 110 determines an upstream path of a first bidirectional RSVP-TE LSP to PE 111. For example, PE 110 requests CSPF 211 to provide an upstream path to PE 111. CSPF 211, in response, returns a set of IP addresses of network devices of the intermediate hops between PE 110 and PE 111. In the example illustrated in FIG. 1, CSPF 211 returns IP addresses 172-174, which are the IP addresses of P 120-121, and PE 111, respectively. P 120-121 and PE 111 collectively make up upstream path 190.

At transaction 410, RSVP-TE control 212 generates RSVP-TE path message 181 and transmits it to PE 111. RSVP-TE path message 181 includes label 130 which identifies the downstream physical link coupling PE 110 and the next hop (i.e., P 120). RSVP-TE path message 181 also includes the IP addresses of the hops in upstream path 190 (i.e., IP address 172-174). As RSVP-TE path message 181 propagates through each hop, labels are inserted into the message. For example, P 120 inserts label 131 (which identifies the downstream physical link coupling P 120 and its next hop, P 121), and P 121 inserts label 132 (which identifies the downstream physical link coupling P 121 and its next hop, PE 111).

In one embodiment, RSVP-TE path message 181 may be configured such it causes PE 111 to use the same upstream path SRLGs (i.e., SRLG 150-152) for the corresponding downstream path. In such an embodiment, PE 111 is required to set up a reverse (downstream) transport path that includes P 121, P 120, and ultimately PE 110. In an alternate embodiment, RSVP-TE path message 181 may be configured such that it does not require PE 111 to use the same upstream path SRLGs for the downstream path. For example, in such an embodiment, PE 111 may choose to include in the downstream path P 124 and ultimately PE 110 (i.e., SRLGs 153-154). At transaction 415, in response to receiving RSVP-TE path message 181, PE 111 determines a downstream path for the first bidirectional RSVP-TE LSP. In the example illustrated in FIG. 1, it is assumed PE 111 has chosen to set up the downstream path that includes P 121, P 120, and ultimately PE 110 (i.e., using SRLGs 150-152). This downstream path is denoted as downstream path 191.

At transaction 420, RSVP-TE control 312 generates RSVP-TE resv message 182 and transmits it to PE 110. RSVP-TE resv message 182 includes label 133 which identifies the upstream physical link coupling PE 111 and the next hop (i.e., P 121). RSVP-TE resv message 182 also includes the IP addresses of the hops in downstream path 191 (i.e., IP address 173, 172, and IP address 171). As RSVP-TE resv message 182 propagates through each hop, labels are inserted into the message. For example, P 121 inserts label 134 (which identifies the upstream physical link coupling P 121 and its next hop, P 120), and P 120 inserts label 135 (which identifies the upstream physical link coupling P 120 and its next hop, PE 110). At this point, a first bidirectional RSVP-TE LSP is established, which includes upstream path 190 and downstream path 191.

At transaction 425, LDP control 213 binds the upstream path of the primary PW to upstream path 190. PE 110 advertises its PW label 194 by transmitting LDP label mapping message 183 over targeted LDP session 160. A conventional LDP label message from an ingress/hub router only binds the upstream path of the primary PW to upstream path 190, and does not cause any binding of the downstream path of the PW. Conventionally, an egress router such as PE 111 is not required to bind the downstream path of the primary PW to any particular LSP. In other words, under a conventional PW set up architecture, an egress router such as PE 111 can establish any LSP and bind it to the downstream path of the primary PW. Thus, under the conventional PW set up mechanism, a hub router such as PE 110 is not able to establish primary and redundant PWs that use disjoint LSPs because the hub router does not have any control over which LSP is used for the downstream path of the PW.

Figure 5:
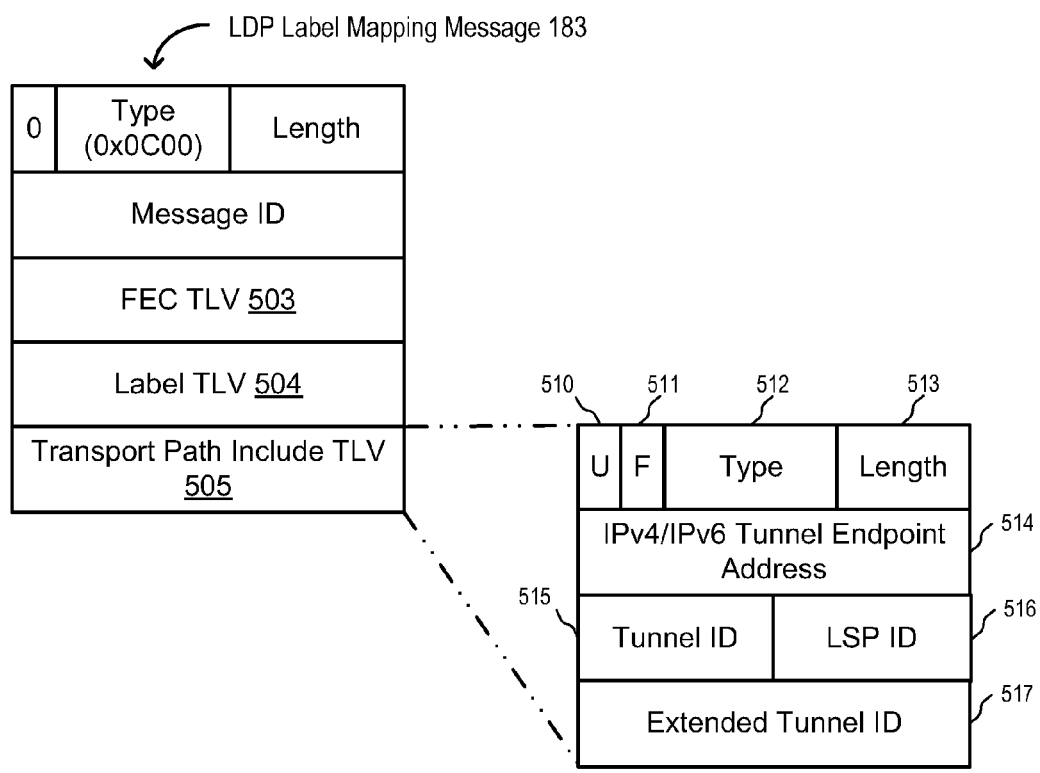
FIG. 5 is a block diagram illustrating a LDP label mapping message according to one embodiment.

In one embodiment, LDP label mapping message 183 includes a Transport Path Include TLV which overcomes the above limitation. In one embodiment, LDP label mapping message 183 includes the TLVs as illustrated in FIG. 5, which is consistent with LDP Request for Comments (RFC) 3036. LDP label mapping message 183, however, includes additional Transport Path Include TLV 505. The definitions of each field (except for Transport Path Include TLV 505) are provided in draft-ietf-pwe3-control-protocol-17, which is hereby incorporated by reference. In particular, FEC TLV 503 includes the PW ID, which in this example, is PW ID 180. Label TLV 504 includes the PW label, which in this example is PW label 194.

In one embodiment, Transport Path Include TLV 505 includes U field 510 (1 bit), F field 511 (1 bit), Type field 512 (14 bits), Length field 513 (16 bits), Tunnel Endpoint Address field 514 (32 bits), Tunnel ID field 515 (16 bits), LSP ID field 516 (16 bits), and Extended Tunnel ID field 517 (32 bits). In one embodiment, U/F fields 510-511 are set to "0/0" to indicate the behavior as described in RFC 3036. In one embodiment, Type field 512 is set to 0x0A00, which indicates that Transport Path Include TLV 505 is for an IPv4 RSVP-TE tunnel. In another embodiment, Type field 512 is set to 0x0C01 to indicate that Transport Path Include TLV 505 is for an IPv6 RSVP-TE tunnel. Length field 513 is set to the value of the length of Transport Path Include TLV 505. Collectively, Tunnel Endpoint Address field 514, Tunnel ID field 515, and Extended Tunnel ID field 517 uniquely identifies a bidirectional RSVP-TE transport tunnel. LSP ID field 516 uniquely identifies a LSP path within the RSVP-TE transport tunnel. In the example of FIG. 1, these four fields uniquely identify upstream path 190 and downstream path 191.

In one embodiment, the presence of Transport Path Include TLV 505 in a LDP label mapping message causes an egress router (e.g., PE 111) to bind a downstream path of a PW to the identified LSP. In this example, by including Transport Path Include TLV 505, LDP label mapping message 183 causes PE 111 to bind the downstream path of the primary PW (identified by PW ID 180) to downstream path 191 (identified by Tunnel Endpoint Address field 514, Tunnel ID field 515, LSP ID field 516, and Extended Tunnel ID field 517).

Referring now back to FIG. 4, at transaction 430, in response to receiving LDP label mapping message 183, LDP control 313 binds the downstream path of the primary PW to downstream path 191. LDP control 313 advertises its PW label 195 for the primary PW by transmitting LDP label mapping message 184. By transmitting LDP label mapping message 184, PE 111 acknowledges that it will use downstream path 191 for the downstream path of the primary PW. At this point, the primary PW is established. The primary PW includes upstream path 190 and downstream path 191.

At transaction 435, PE 111 determines the SRLGs used by the first bidirectional RSVP-TE LSP. For example, control processor 205 provides CSPF 211 with the IP addresses of the first bidirectional RSVP-TE LSP (i.e., IP addresses 171-174). CSPF 211, in response, provides the SRLGs that these IP addresses belong to. In the example of FIG. 1, CSPF 211 returns SRLGs 150-152. At transaction 440, RSVP-TE control 212 determines an upstream path for a second bidirectional RSVP-TE LSP by passing these SRLGs of the first bidirectional RSVP-TE LSP back to CSPF 211 as an exclude list. In the example of FIG. 1, CSPF 211 determines that upstream path 192 should be used. Accordingly, CSPF 211 returns IP addresses 176, 177, and 174, which are assigned to P 122, P 123, and PE 111, respectively.

At transaction 445, RSVP-TE control 212 establishes an upstream path for a second bidirectional RSVP-TE LSP by transmitting RSVP-TE path message 185 to PE 111. PE 110 inserts its label 140 in RSVP-TE path message 185. As RSVP-TE path message 185 propagates through the network, P 122 inserts its label 141, and P 123 inserts its label 142. Labels 140-142 identify a reverse (downstream) path from PE 111 to PE 110.

In one embodiment, RSVP-TE path message 185 is configured such that it causes PE 111 to use the same upstream path SRLGs (i.e., SRLG 155-157) for the corresponding downstream path. In such an embodiment, PE 111 is required to set up a reverse (downstream) transport path that includes P 122, P 123, and ultimately PE 110 (i.e., using SRLGs 155-157). This downstream path is denoted as downstream path 193.

At transaction 450, in response to receiving RSVP-TE path message 185, PE 111 determines a downstream path for the second bidirectional RSVP-TE LSP. Because path message 185 is configured such that it causes PE 111 to use the same upstream path SRLGs, control processor 305 passes the IP addresses of upstream path 192 (i.e., IP addresses 176, 177, and 174) to CSPF 311. CSPF 311, in response, returns the SRLGs to which these IP addresses belong. In this example, CSPF 311 returns SRLGs 155-157. In order to determine the downstream path, RSVP-TE control 312 passes these SRLGs back to CSPF 311. CSPF 311, in response, returns IP addresses 177, 176, and 171, which collectively make up downstream path 193.

At transaction 455, PE 111 transmits back to PE 110 RSVP-TE resv message 186. PE 111 inserts its label 143 in RSVP-TE resv message 186. As RSVP-TE resv message 186 propagates through the network, P 123 inserts its label 144, and P 122 inserts its label 145. At this point, the second bidirectional RSVP-TE LSP is established. This second bidirectional RSVP-TE LSP includes upstream path 192 having physical links identified by labels 145, 144, and 143. The second bidirectional RSVP-TE LSP also includes downstream path 193 having physical links identified by labels 142, 141, and 140.

At transaction 460, LDP control 213 binds the upstream path of the redundant PW to upstream path 192. PE 110 advertises its PW label 194 by transmitting LDP label mapping message 187 over targeted LDP session 160. A conventional LDP label message from an ingress/hub router only binds the upstream path of the redundant PW to an upstream RSVP-TE LSP (e.g., upstream path 192), and does not cause any binding of the downstream path of the PW. Conventionally, an egress router such as PE 111 is not required to bind the downstream path of the redundant PW to any particular LSP. In other words, under a conventional PW set up architecture, an egress router such as PE 111 can establish any LSP and bind it to the downstream path of the redundant PW. Thus, under the conventional PW set up mechanism, a hub router such as PE 110 is not able to establish primary and redundant PWs that use disjoint LSPs because the hub router does not have any control over which LSP is used for the downstream path of the PW.

Figure 6:
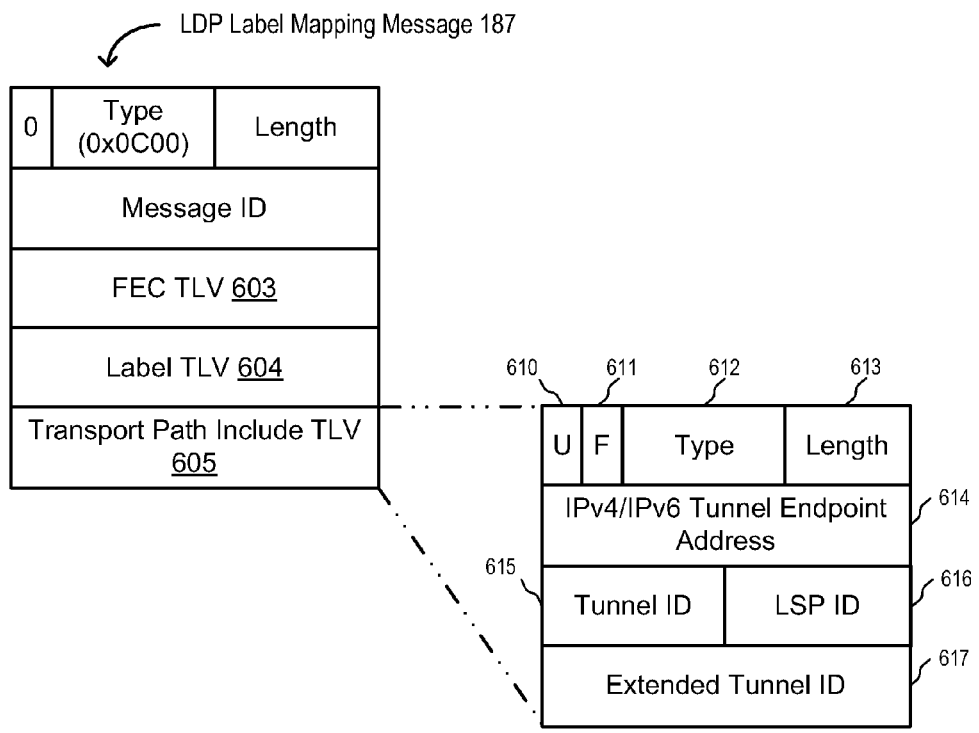
FIG. 6 is a block diagram illustrating a LDP label mapping message according to one embodiment.

In one embodiment, LDP label mapping message 187 includes a Transport Path Include TLV which overcomes the above limitation. In one embodiment, LDP label mapping message 187 includes the TLVs as illustrated in FIG. 6, which is consistent with LDP RFC 3036. LDP label mapping message 187, however, includes additional Transport Path Include TLV 605. The definitions of each field (except for Transport Path Include TLV 605) are provided in draft-ietf-pwe3-control-protocol-17. In particular, FEC TLV 603 includes the PW ID, which in this example, is PW ID 180. Label TLV 604 includes the PW label, which in this example is PW label 194.

In one embodiment, Transport Path Include TLV 605 includes U field 610 (1 bit), F field 611 (1 bit), Type field 612 (14 bits), Length field 613 (16 bits), Tunnel Endpoint Address field 614 (32 bits), Tunnel ID field 615 (16 bits), LSP ID field 616 (16 bits), and Extended Tunnel ID field 617 (32 bits). In one embodiment, U/F fields 610-611 are set to "0/0" to indicate the behavior as described in RFC 3036. In one embodiment, Type field 612 is set to 0x0A00, which indicates that Transport Path Include TLV 605 is for an IPv4 RSVP-TE tunnel. In another embodiment, Type field 612 is set to 0x0C01 to indicate that Transport Path Include TLV 605 is for an IPv6 RSVP-TE tunnel. Length field 613 is set to the value of the length of Transport Path Include TLV 605. Collectively, Tunnel Endpoint Address field 614, Tunnel ID field 615, and Extended Tunnel ID field 617 uniquely identifies a bidirectional RSVP-TE transport tunnel. LSP ID field 616 uniquely identifies a LSP path within the RSVP-TE transport tunnel. In the example of FIG. 1, these four fields uniquely identify upstream path 192 and downstream path 193.

In one embodiment, the presence of Transport Path Include TLV 605 in a LDP label mapping message causes an egress router (e.g., PE 111) to bind a downstream path of a PW to the identified LSP. In this example, by including Transport Path Include TLV 605, LDP label mapping message 187 causes PE 111 to bind the downstream path of the redundant PW (identified by PW ID 180) to downstream path 193 (identified by Tunnel Endpoint Address field 614, Tunnel ID field 615, LSP ID field 616, and Extended Tunnel ID field 617).

Referring now back to FIG. 4, at transaction 465, in response to receiving LDP label mapping message 187, LDP control 313 binds the downstream path of the redundant PW to downstream path 193. LDP control 313 advertises its PW label 195 for the redundant PW by transmitting LDP label mapping message 188. By transmitting LDP label mapping message 188, PE 111 acknowledges that it will use downstream path 193 for the downstream path of the redundant PW. At this point, the redundant PW is established. The redundant PW includes upstream path 192 and downstream path 193. It is worth reiterating that by including Transport Path Include TLV 605 in LDP label mapping message 187, PE 110 is able to cause PE 111 to use a specific second bidirectional RSVP-TE LSP for the redundant PW. PE 110 ensures that the primary and redundant PWs use disjoint MPLS transport paths by ensuring that the second bidirectional RSVP-TE LSP is disjoint from the first bidirectional RSVP-TE LSP.

Figure 7:
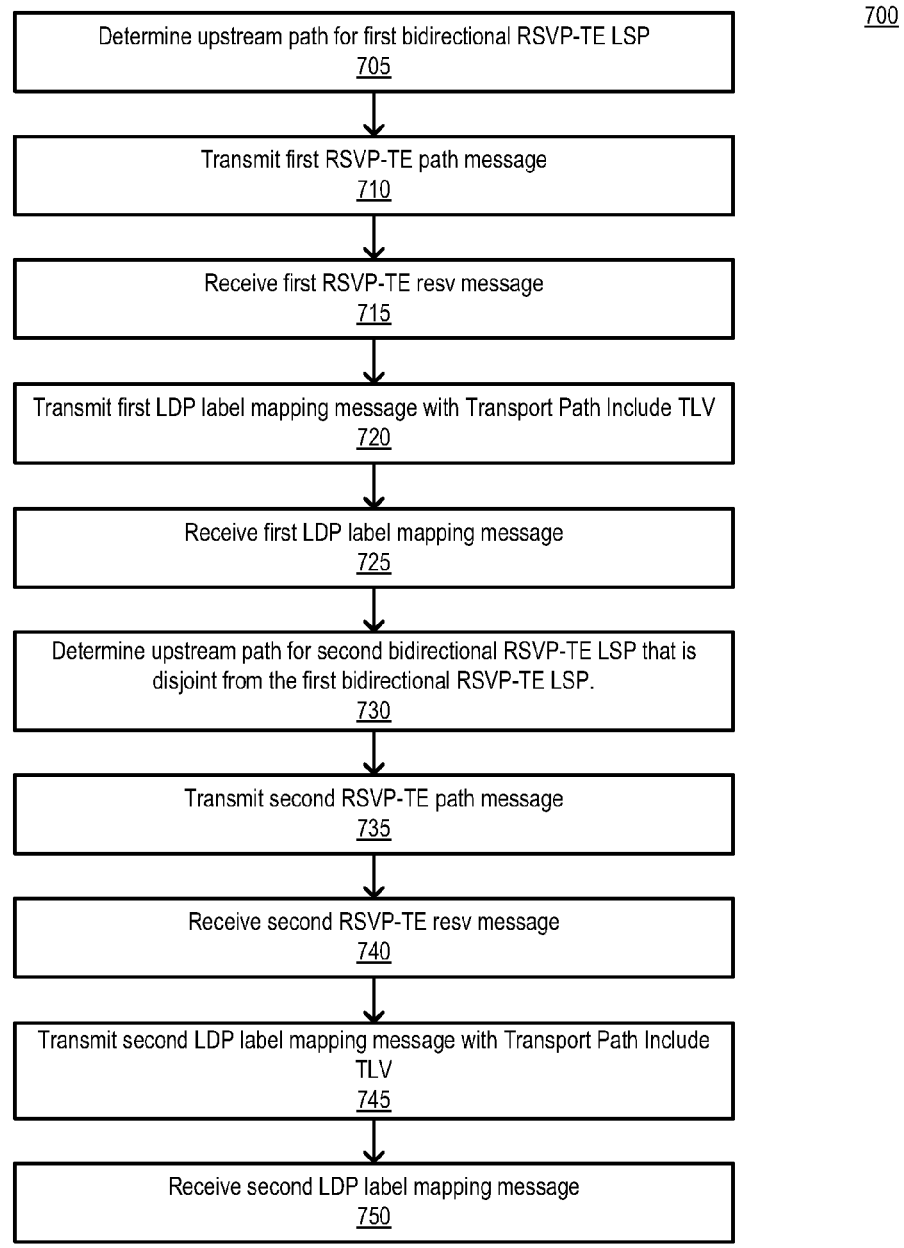
FIG. 7 is a flow diagram illustrating a method for establishing a primary and redundant PW over disjoint bidirectional RSVP-TE LSPs according to one embodiment.

FIG. 7 is a flow diagram illustrating method 700 for establishing primary and redundant PWs over disjoint bidirectional RSVP-TE LSPs according to one embodiment. For example, method 700 can be performed by PE 110. Method 700 can be performed in software, firmware, hardware, or any combination thereof. Method 700 assumes that PE 110 has received a request (e.g., from a system administrator) to establish a primary and redundant PW over disjoint RSVP-TE LSPs. Method 700 will now be discussed with reference to FIG. 1 and FIG. 4.

At block 705, PE 110 determines an upstream path for a first bidirectional RSVP-TE LSP. For example, PE 110 performs the steps similar to those at transaction 405. At block 710, PE 110 transmits a first RSVP-TE path message to establish the upstream path for the first bidirectional RSVP-TE LSP. For example, PE 110 performs the steps similar to those at transaction 410. At block 715, PE 110 receives a first RSVP-TE LSP resv message corresponding to the first RSVP-TE path message transmitted at block 710. For example, PE 110 receives RSVP-TE resv message 182 from PE 111 over RSVP-TE session 161. At this point, the first bidirectional RSVP-TE LSP is established.

At block 720, PE 110 transmits a first LDP label mapping message which includes the Transport Path Include TLV as shown in FIG. 5. For example, PE 110 performs the steps similar to those at transaction 425. At block 725, PE 110 receives a first LDP label mapping message corresponding to the first LDP label mapping message transmitted at block 720. For example, PE 110 receives LDP label mapping message 184 from PE 111 over targeted LDP session 160. At this point, the primary PW is established and bound to the first bidirectional RSVP-TE LSP. At block 730, PE 110 determines an upstream path for a second bidirectional RSVP-TE LSP that is disjoint from the first bidirectional RSVP-TE LSP. For example, PE 110 performs the steps similar to those at transactions 435-440.

At block 735, PE 110 transmits a second RSVP-TE path message to establish the upstream path of the second bidirectional RSVP-TE LSP. The second RSVP-TE path message causes the receiving egress router to establish a downstream path for the second bidirectional RSVP-TE LSP using the same SRLGs of the upstream path of the second bidirectional RSVP-TE LSP. For example, PE 110 performs the steps similar to those at transaction 445. At block 740, PE 110 receives a second RSVP-TE resv message which establishes the downstream path of the second bidirectional RSVP-TE LSP. For example, PE 110 receives RSVP-TE resv message 186 from PE 111 over RSVP-TE session 161. At this point, the second bidirectional RSVP-TE LSP is established, which is disjoint from the first bidirectional RSVP-TE LSP.

At block 745, PE 110 transmits a second LDP label mapping message which includes the Transport Path Include TLV as shown in FIG. 6. In one embodiment, the Transport Include Path TLV causes the receiving egress router to bind the downstream path of the redundant PW to the downstream path of the second bidirectional RSVP-TE LSP. For example, PE 110 performs the steps similar to those at transaction 460. At block 750, PE 110 receives a second LDP label mapping message which advertises the binding of the downstream path of the redundant PW to the downstream path of the second bidirectional RSVP-TE LSP. For example, PE 110 receives LDP label mapping message 188 from PE 111 over targeted LDP session 160. At this point, the redundant PW is established which uses the second bidirectional RSVP-TE LSP as the transport path. The primary and redundant PWs use disjoint MPLS transport paths because the first and second bidirectional RSVP-TE LSPs are disjoint.

Figure 8:
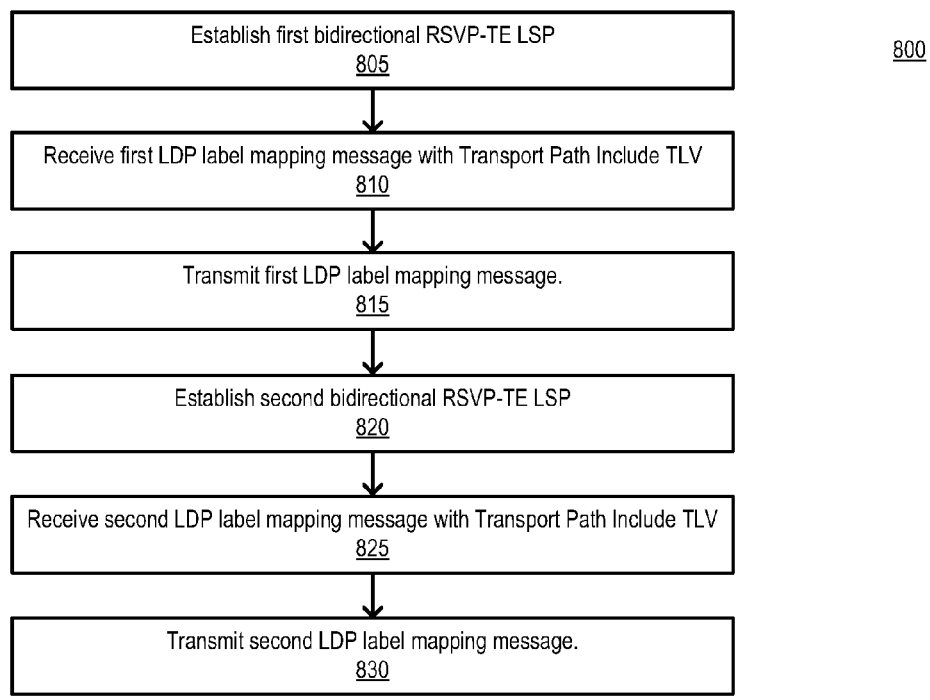
FIG. 8 is a flow diagram illustrating a method for establishing a primary and redundant PW over disjoint bidirectional RSVP-TE LSPs according to one embodiment.

FIG. 8 is a flow diagram illustrating method 800 for establishing primary and redundant PWs over disjoint bidirectional RSVP-TE LSPs according to one embodiment. For example, method 800 can be performed by PE 111. Method 800 can be performed by software, firmware, hardware, or any combination thereof. Method 800 will now be discussed with reference to FIG. 1 and FIG. 4. At block 805, PE 111 establishes a first bidirectional RSVP-TE LSP. For example, PE 111 receives RSVP-TE path message 181, transmits RSVP-TE resv message 182, and performs the steps similar to those at transaction 415.

At block 810, PE 111 receives a first LDP label mapping message with a Transport Path Include TLV. For example, PE 111 receives label mapping message 183 from PE 110 over targeted LDP session 160. In one embodiment, LDP label mapping message 183 includes a Transport Path Include TLV (as shown in FIG. 5) which causes PE 111 to bind the downstream path of the primary PW to the downstream path of the first bidirectional RSVP-TE LSP. At block 815, PE 111 binds the downstream path of the primary PW to the downstream path of the first bidirectional RSVP-TE-LSP and transmits a first LDP label mapping message. For example, PE 111 transmits LDP label mapping message 184 to PE 110 over targeted LDP session 160.

At block 820, PE 111 establishes a second bidirectional RSVP-TE LSP. For example, PE 111 receives RSVP-TE path message 185, transmits RSVP-TE resv message 186, and performs steps similar to those at transaction 450. At block 825, PE 111 receives a second LDP label mapping message which includes the Transport Path Include TLV (e.g., Transport Path Include TLV 605). The Transport Path Include TLV causes PE 111 to bind the downstream path of the redundant PW to the downstream path of second bidirectional RSVP-TE LSP. At block 830, PE 111 transmits a second LDP label mapping message (e.g., LDP label mapping message 188) as an acknowledgement that it will use the downstream path (193) of the second bidirectional RSVP-TE LSP as the downstream transport path of the redundant PW.

Embodiments of the present methods, apparatuses, and systems for establishing a primary and redundant PW over disjoint bidirectional RSVP-TE LSPs have been illustrated above by way of example and not limitation in the figures. One having ordinary skill in the art would recognize that the present methods, apparatuses, and systems are not limited to the exact network configuration as illustrated in FIG. 1. For example, in some embodiments, there may be more or less provider routers between PE 110 and PE 111. Moreover, in other embodiments, there may be more than one egress router. For example, the primary PW may be terminated at one egress router while the redundant PW may be terminated at a different egress router. In yet other embodiments, there may also be more than one redundant PW.

Figure 9:
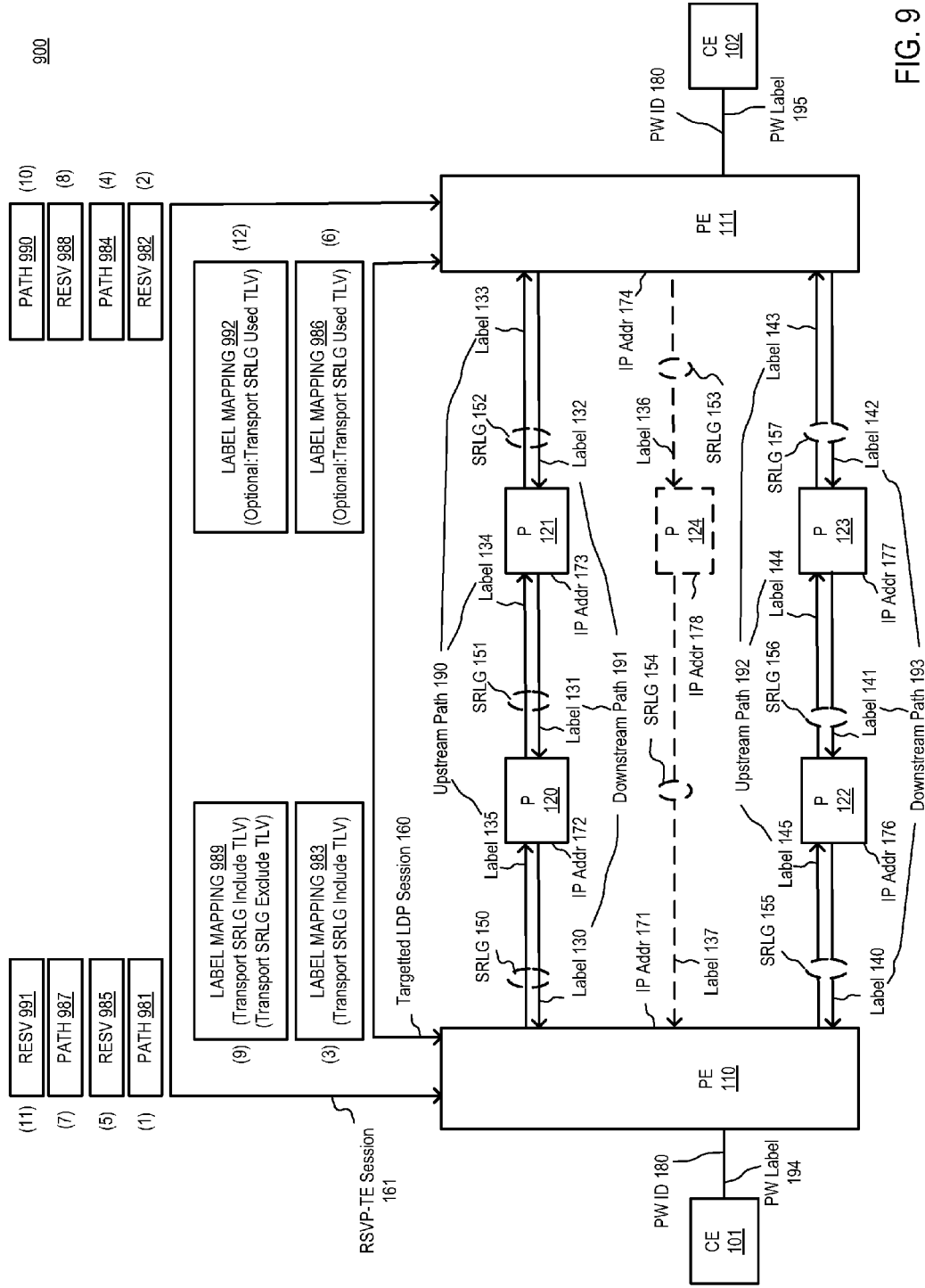
FIG. 9 is a block diagram illustrating a VPLS network according to one embodiment.

FIG. 9 is a block diagram illustrating VPLS network 900. VPLS network 900 is similar to VPLS network 100 described above. The assumptions and nomenclatures of FIG. 1 apply equally in FIG. 9. The difference between the two VPLS networks is that VPLS network 900 uses a different set of message signaling to establish disjoint MPLS transport paths for the primary and redundant PWs. VPLS network 900 illustrates the use of unidirectional RSVP-TE to establish MPLS transport paths, and a different LDP mechanism for binding the PWs to the disjoint unidirectional RSVP-TE LSPs.

Referring now to FIG. 9. In response to the request for a PW to be established, PE 110 determines an upstream MPLS transport path. In the illustration, PE 110 has determined that the upstream path should include P 120, P 121, and ultimately PE 111. This is denoted as upstream path 190. Accordingly, at (1), PE 110 transmits RSVP-TE path message 981 to PE 111 over RSVP-TE session 161. RSVP-TE path message 981 contains IP addresses 172-174, which have been assigned to P 120, P 121, and PE 111, respectively.

At (2), in response to receiving RSVP-TE path message 981, inserts its label 133 into RSVP-TE resv message 982 and transmits it to PE 110 over RSVP-TE session 161. As RSVP-TE resv message 182 propagates through the network, P 121 inserts its label 134, and P 120 inserts its label 135. At this point, a first upstream unidirectional RSVP-TE LSP is established. This first upstream unidirectional RSVP-TE LSP includes upstream path 190 having physical links identified by labels 135, 134, and 133, which belong to SRLGs 150, 151, and 152, respectively.

At (3), PE 110 binds upstream path 190 to the primary PW and transmits LDP label mapping message 983 to PE 111 over targeted LDP session 160. LDP label mapping message 983 also serves as a request for PE 111 to establish a downstream RSVP-TE LSP and bind it to the downstream path of the primary PW. Conventionally, a LDP label mapping message from an ingress/hub router only binds the upstream path of the primary PW to an upstream RSPV-TE LSP (e.g., upstream path 190). In a conventional PW set up, PE 110 does not have any control over which downstream LSP is used by PE 111 for the downstream path of the primary PW. This is problematic because it prevents a hub router (such as PE 110) from establishing primary and redundant PWs that use disjoint LSPs since the hub router does not have control over which LSP is used by the egress router (such as PE 111).

In one embodiment, LDP label mapping message 983 includes a Transport SRLG Include TLV to overcome the above limitation associated with the conventional LDP label mapping message. In one embodiment, the Transport SRLG Include TLV includes a list of one or more SRLGs that PE 110 would like PE 111 to use for establishing a downstream unidirectional RSVP-TE LSP. For example, the Transport SRLG Include TLV may be a list of one or more SRLGs that make up the corresponding upstream RSVP-TE LSP, such as upstream path 190 (i.e., SRLGs 150-152).

At (4), in response to receiving LDP label mapping message 983, PE 111 establishes a downstream unidirectional RSVP-TE LSP by transmitting RSVP-TE path message 984. PE 111 may use the SRLGs included in the Transport SRLG Include TLV of LDP label mapping message 983 to establish the downstream unidirectional RSVP-TE LSP. Alternatively, PE 111 may establish a downstream unidirectional RSVP-TE LSP using one or more SRLGs that are different from those included in the Transport SRLG Include TLV of LDP label mapping message 983. In the example illustrated in FIG. 9, PE 111 has chosen to establish downstream unidirectional RSVP-TE LSP 191 using the same SRLGs as those included in the Transport SRLG Include TLV of LDP label mapping message 983.

At (5), in response to receiving RSVP-TE path message 984, PE 110 inserts its label 130 into RSVP-TE resv message 985 and transmits it to PE 111 over RSVP-TE session 161. As RSVP-TE resv message 985 propagates through the network, P 120 inserts its label 131, and P 121 inserts its label 132. At this point, a downstream unidirectional RSVP-TE LSP is established. This downstream unidirectional RSVP-TE LSP includes downstream path 191 having physical links identified by labels 132, 131, and 130, which belong to SRLGs 152, 151, and 150, respectively.

At (6), PE 111 binds downstream path 191 to the primary PW and transmits LDP label mapping message 986 to PE 110. In some embodiments, PE 111 decides to establish a downstream unidirectional RSVP-TE LSP that includes one or more SRLGs that are not included in the Transport SRLG Include TLV of LDP label mapping message 983. In such embodiments, PE 111 includes an optional Transport SRGL Used TLV in LDP label mapping message 986. The Transport SRLG Used TLV includes the one or more SRLGs used in the downstream path which are not included in the Transport SRLG Include TLV of LDP label mapping message 983. For example, if PE 111 decides to establish a downstream LSP that includes P 124 and PE 110, then the Transport SRLG Used TLV would include SRLGs 153-154. In the example illustrated in FIG. 9, the optional Transport SRLG Used TLV is not included in LDP label mapping message 986 because downstream path 191 use the same SRLGs as those included in the Transport SRLG Include TLV of LDP label mapping message 983.

Next, PE 110 establishes a redundant PW by first establishing a second upstream unidirectional RSVP-TE LSP. PE 110 determines an upstream MPLS transport path for the second unidirectional RSVP-TE LSP. In this illustration, it is assumed that PE 110 has determined that the second upstream unidirectional RSVP-TE LSP should include P 122, P 123, and ultimately PE 111. This is denoted as upstream path 192. Accordingly, at (7), PE 110 transmits RSVP-TE path message 987 to PE 111 over RSVP-TE session 161. RSVP-TE path message 987 contains IP addresses 176, 177, and 174, which have been assigned to P 122, P 123, and PE 111, respectively.

At (8), in response to receiving path message 987, PE 111 inserts its label 143 in RSVP-TE resv message 988 and transmits the message to PE 110 over RSVP-TE session 161. As RSVP-TE resv message 988 propagates through the network, P 123 inserts its label 144, and P 122 inserts its label 145. At this point, the second upstream unidirectional RSVP-TE LSP is established. This second upstream unidirectional RSVP-TE LSP path includes upstream path 192 having physical links identified by labels 145, 144, and 143, which belong to SRLGs 155, 156, and 157, respectively.

At (9), PE 110 binds upstream path 192 to the upstream path of the redundant PW and transmits LDP label mapping message 989 to PE 111. LDP label mapping message 989 also serves as a request for PE 111 to establish a downstream RSVP-TE LSP and bind it to the downstream path of the redundant PW. Conventionally, a LDP label mapping message from an ingress/hub router only binds the upstream path of the primary PW to an upstream RSVP-TE LSP (e.g., upstream path 192). In a conventional PW set up, PE 110 does not have any control over which downstream LSP is used by PE 111 for the downstream path of the redundant PW. This is problematic because it prevents a hub router (such as PE 110) from establishing primary and redundant PWs that use disjoint LSPs since the hub router does not have control over which LSP is used by the egress router (such as PE 111).

In one embodiment, LDP label mapping message 989 includes a Transport SRLG Include TLV to overcome the above limitation associated with the conventional LDP label mapping message. In one embodiment, the Transport SRLG Include TLV includes a list of one or more SRLGs that PE 110 would like PE 111 to use for establishing a downstream unidirectional RSVP-TE LSP. For example, the Transport SRLG Include TLV may include a list of one or more SRLGs that make up upstream path 192 (i.e., SRLGs 155-157).

In one embodiment, LDP label mapping message 989 includes a Transport SRLG Exclude TLV. The Transport SRLG Exclude TLV includes a list of one or more SRLGs that PE 111 must not use for establishing the second downstream unidirectional RSVP-TE LSP. In one embodiment, the SRLGs in the Transport SRLG Exclude TLV are the SRLGs that are used by the primary PW (e.g., upstream path 190 and downstream path 191). In the example illustrated in FIG. 9, the Transport SRLG Exclude TLV includes SRLGs 150-152.

At (10), in response to receiving LDP label mapping message 989, PE 111 establishes a downstream unidirectional RSVP-TE LSP by transmitting RSVP-TE path message 990. PE 111 may use the SRLGs included in the Transport SRLG Include TLV of LDP label mapping message 989 to establish the downstream unidirectional RSVP-TE LSP. Alternatively, PE 111 may establish a downstream unidirectional RSVP-TE LSP using one or more SRLGs that are different from those included in the Transport SRLG Include TLV of LDP label mapping message 989. In one embodiment, PE 111, however, must not use any SRLGs included in the Transport SRLG Exclude TLV of LDP label mapping message 989 to establish the second downstream unidirectional RSVP-TE LSP. In the example illustrated in FIG. 9, PE 111 has chosen to establish downstream unidirectional RSVP-TE LSP 193 using the same SRLGs as those included in the Transport SRLG Include TLV of LDP label mapping message 989 (i.e., SRLGs 155-157).

At (11), in response to receiving RSVP-TE path message 990, PE 110 inserts its label 140 into RSVP-TE resv message 991 and transmits it to PE 111 over RSVP-TE session 161. As RSVP-TE resv message 991 propagates through the network, P 122 inserts its label 141, and P 123 inserts its label 142. At this point, a second downstream unidirectional RSVP-TE LSP is established. This downstream unidirectional RSVP-TE LSP includes downstream path 193 having physical links identified by labels 142, 141, and 140, which belong to SRLGs 157, 156, and 155, respectively.

At (12), PE 111 binds downstream path 193 to the redundant PW and transmits LDP label mapping message 992 to PE 110 over LDP session 160. In some embodiments, PE 111 decides to establish a downstream unidirectional RSVP-TE LSP that includes one or more SRLGs that are not included in the Transport SRLG Include TLV of LDP label mapping message 989. In such embodiments, PE 111 includes an optional Transport SRGL Used TLV in LDP label mapping message 992. The Transport SRLG Used TLV includes the one or more SRLGs used in the downstream path which are not included in the Transport SRLG Include TLV of label mapping message 989. For example, if PE 111 decides to establish a downstream RSVP-TE LSP that includes P 124 and PE 110, then the Transport SRLG Used TLV would include SRLGs 153-154. In the example illustrated in FIG. 9, the optional Transport SRLG Used TLV is not included in LDP label mapping message 992 because downstream path 193 use the same SRLGs as those included in the Transport SRLG Include TLV of LDP label mapping message 989 (i.e., SRLGs 155-157). By using the mechanisms of the present invention, PE 110 is able to establish a primary PW with a transport path consisting of upstream unidirectional RSVP-TE LSP 190 and downstream unidirectional RSVP-TE LSP 191, and a redundant PW with a transport path consisting of upstream unidirectional RSVP-TE LSP 192 and downstream unidirectional RSVP-TE LSP 193, wherein the transport paths of the primary and redundant PWs are disjoint.

Embodiments of the present methods, apparatuses, and systems for establishing a primary and redundant PW over disjoint unidirectional RSVP-TE LSPs have been illustrated above by way of example and not limitation in the figures. One having ordinary skill in the art would recognize that the present methods, apparatuses, and systems are not limited to the exact network configuration as illustrated in FIG. 9. For example, in some embodiments, there may be more or less provider routers between PE 110 and PE 111. Moreover, in other embodiments, there may be more than one egress router. For example, the primary PW may be terminated at one egress router while the redundant PW may be terminated at a different egress router. In yet other embodiments, there may also be more than one redundant PW.

Figure 10:
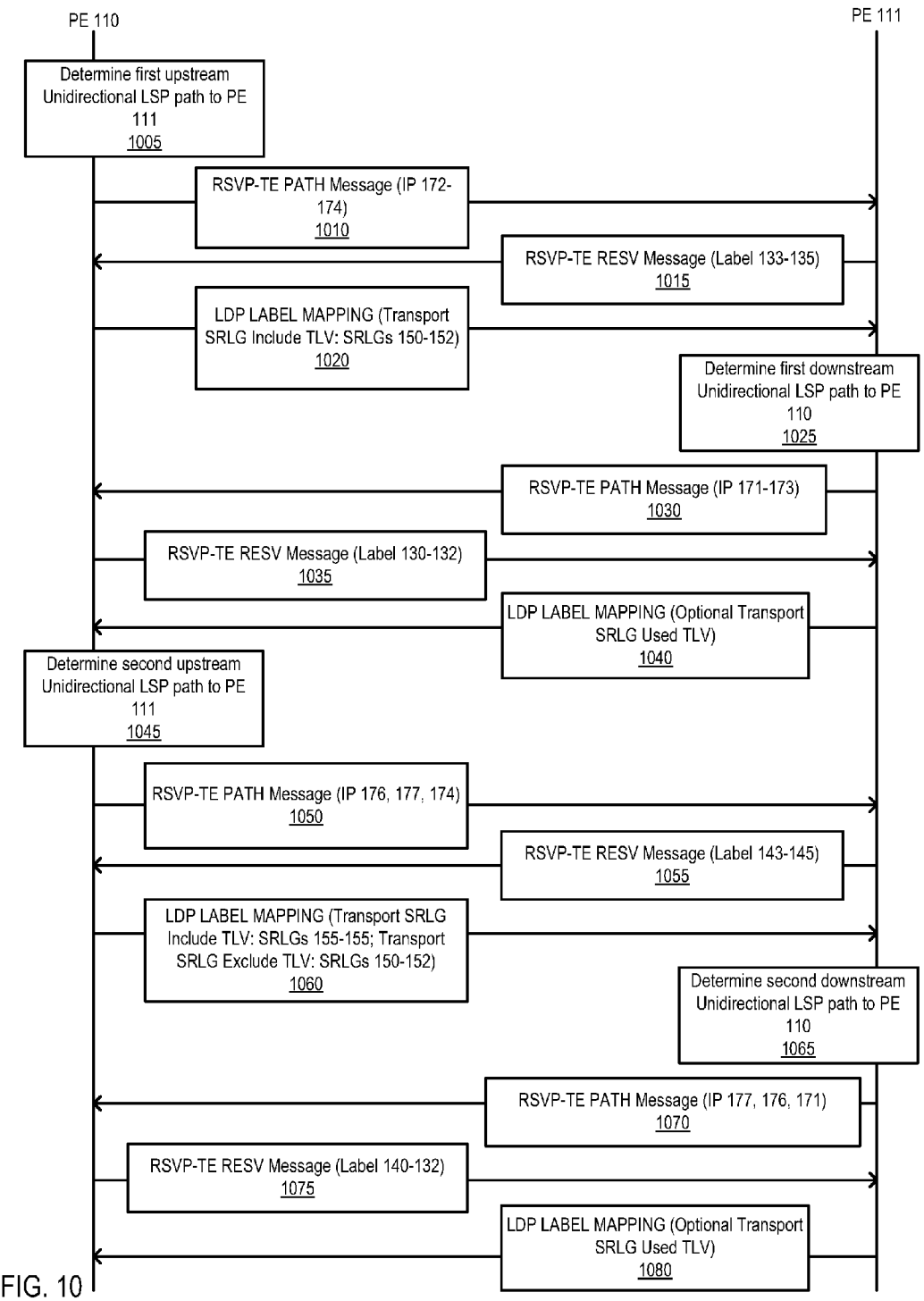
FIG. 10 is a transaction diagram illustrating a process flow for establishing a primary and redundant PW over disjoint unidirectional RSVP-TE LSPs according to one embodiment.

FIG. 10 is a transaction diagram illustrating process flow 1000 for establishing primary and redundant PWs that use disjoint unidirectional RSVP-TE LSPs. Process flow 1000 assumes that PE 110 has received a request (e.g., from a system administrator) to establish a PW with redundancy. Process flow 1000 is discussed with reference to FIGS. 2, 3, and 9. At transaction 1005, PE 110 determines an upstream path of a first unidirectional RSVP-TE LSP to PE 111. For example, PE 110 requests CSPF 211 to provide an upstream path to PE 111. CSPF 211, in response, returns a set of IP addresses of network devices of the intermediate hops between PE 110 and PE 111. In the example illustrated in FIG. 9, CSPF 211 returns IP addresses 172-174, which are the IP addresses of P 120-121, and PE 111, respectively. P 120-121 and PE 111 collectively make up upstream path 190.

At transaction 1010, RSVP-TE control 212 generates RSVP-TE path message 981 and transmits it to PE 111 over targeted RSVP-TE session 160. In one embodiment, RSVP-TE path message 981 includes IP addresses 172-174 which have been assigned to P 120, P 121, and PE 111, respectively.

At transaction 1015, in response to receiving RSVP-TE path message 981, RSVP-TE control 312 generates RSVP-TE resv message 982 and transmits it to PE 110. RSVP-TE resv message 982 includes label 133 which identifies the upstream physical link coupling PE 111 and the next hop (i.e., P 121). As RSVP-TE resv message 982 propagates through each hop, labels are inserted into the message. For example, P 121 inserts label 134 (which identifies the upstream physical link coupling P 121 and its next hop P 120), and P 120 inserts label 135 (which identifies the upstream physical link coupling P 120 and its next hop, PE 110). At this point, a first upstream unidirectional RSVP-TE LSP is established, which includes upstream path 190.

At transaction 1020, LDP control 213 binds the upstream path of the primary PW to upstream path 190. PE 110 advertises its PW label 194 by transmitting LDP label mapping message 983 over targeted LDP session 160. LDP label mapping message 983 also serves as a request for PE 111 to establish a downstream RSVP-TE LSP and bind it to the downstream path of the primary PW. Conventionally, a LDP label mapping message from an ingress/hub router only binds the upstream path of the primary PW to upstream path 190. In a conventional PW set up, PE 110 does not have any control over which downstream LSP is used by PE 111 for the downstream path of the primary PW. This is problematic because it prevents a hub router (such as PE 110) from establishing primary and redundant PWs that use disjoint LSPs since the hub router does not have control over which LSP is used by the egress router (such as PE 111).

Figure 11:
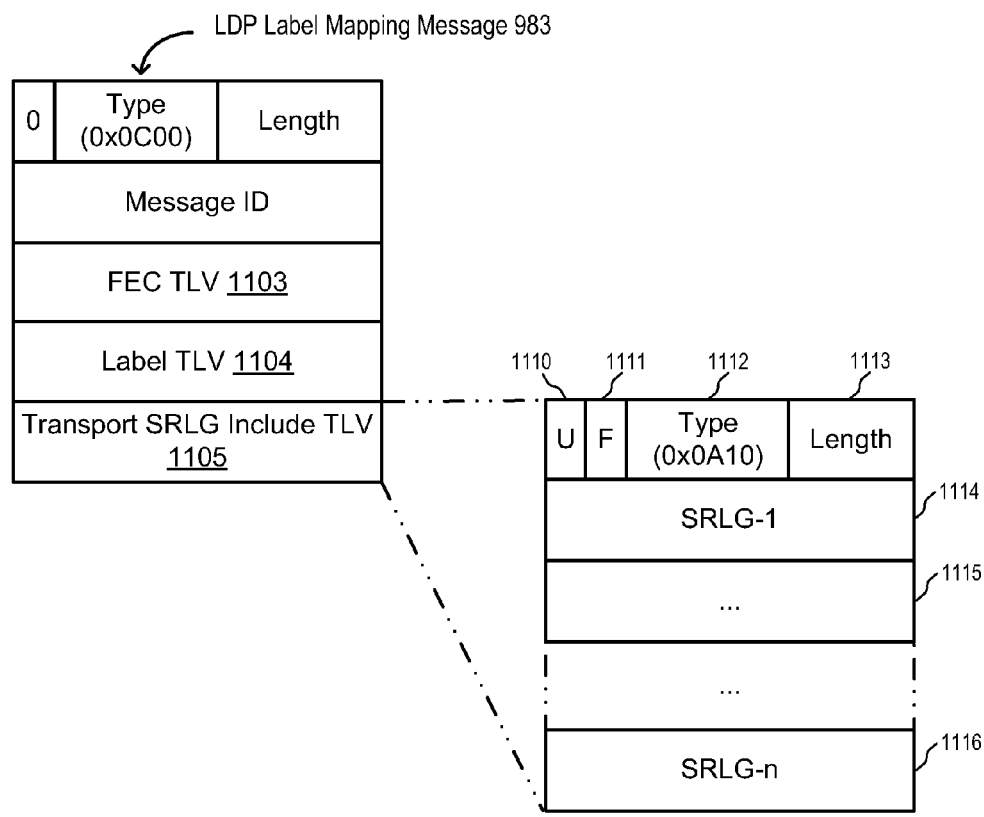
FIG. 11 is a block diagram illustrating a LDP label mapping message according to one embodiment.

In one embodiment, LDP label mapping message 983 includes a Transport SRLG Include TLV to overcome the above limitation associated with the conventional LDP label mapping message. In one embodiment, LDP label mapping message 983 includes the TLVs as illustrated in FIG. 11, which is consistent with LDP RFC 3036. LDP label mapping message 983, however, includes additional Transport SRLG Include TLV 1105. The definitions of each field (except for Transport SRLG Include TLV 1105) are provided in draft-ietf-pwe3-control-protocol-17. In particular, FEC TLV 1103 includes the PW ID, which in this example, is PW ID 180. Label TLV 1104 includes the PW label, which in this example is PW label 194.

In one embodiment, Transport SRLG Include TLV 1105 includes U field 1110 (1 bit), F field 1111 (1 bit), Type field 1112 (14 bits), Length field 1113 (16 bits), and one or more SRLG fields 1114-1116. In one embodiment, U/F fields 1110-1111 are set to "0/0" to indicate the behavior as described in RFC 3036. In one embodiment, Type field 1112 is set to 0x0A10. Length field 1113 is set to the value of the length of Transport SRLG Include TLV 1105. In one embodiment, SRLGs 1114-1116 is a list of one or more SRLGs that PE 110 would like PE 111 to use for establishing the downstream unidirectional RSVP-TE LSP. In one embodiment, SRLGs 1114-1116 are the SRLGs that are used in the corresponding upstream unidirectional RSVP-TE LSP such as upstream path 190 (i.e., SRLGs 150-152). For example, control processor 205 provides CSPF 211 with the IP addresses of upstream path 190 (i.e., IP addresses 171-174). CSPF 211, in response, returns the SRLGs that the IP addresses belong to (i.e., SRLGs 150-152). FIG. 11 illustrates LDP label mapping message 983 only for illustrative purpose and not as a limitation. For example, although SRLGs 1114-1116 are included in Transport SRLG Include TLV 1105, it will be appreciated that more or less SRLGs may be included. In one embodiment, Transport SRLG Include TLV 1105 serves as a request for PE 111 to establish a corresponding downstream RSVP-TE LSP using the same SRLGs as those included in Transport SRLG Include TLV 1105.

Referring now back to FIG. 10, at transaction 1025, in response to receiving Transport SRLG Include TLV 1105, PE 111 determines a downstream unidirectional RSVP-TE LSP path to PE 110. RSVP-TE control 312 passes SRLGs 1114-1116 of LDP label mapping message 983 to CSPF 311. In one embodiment, CSPF 311 returns IP addresses that belong to SRLGs 1114-1116. In another embodiment, CSPF 311 returns one or more IP addresses that do not belong to SRLGs 1114-1116. In the example illustrated in FIG. 9, CSPF 311 returns IP addresses 173, 172, and 170, which have been assigned to P 121, P 120, and PE 110, respectively. IP addresses 173, 172, and 170 make up downstream path 191 that include SRLGs 150-152.

At transaction 1030, RSVP-TE control 312 generates RSVP-TE path message 984 and transmits it to PE 110 over targeted RSVP-TE session 160. In one embodiment, RSVP-TE path message 984 includes IP addresses IP addresses 173, 172, and 170. At transaction 1035, in response to receiving RSVP-TE path message 984, RSVP-TE control 212 generates RSVP-TE resv message 985 and transmits it to PE 111. RSVP-TE resv message 985 includes label 130 which identifies the downstream physical link coupling PE 110 and the next hop (i.e., P 120). As RSVP-TE resv message 985 propagates through each hop, labels are inserted into the message. For example, P 120 inserts label 131 (which identifies the downstream physical link coupling P 120 and its next hop P 121), and P 121 inserts label 132 (which identifies the downstream physical link coupling P 121 and its next hop, PE 111). At this point, a first downstream unidirectional RSVP-TE LSP is established, which includes downstream path 191.

Figure 12:
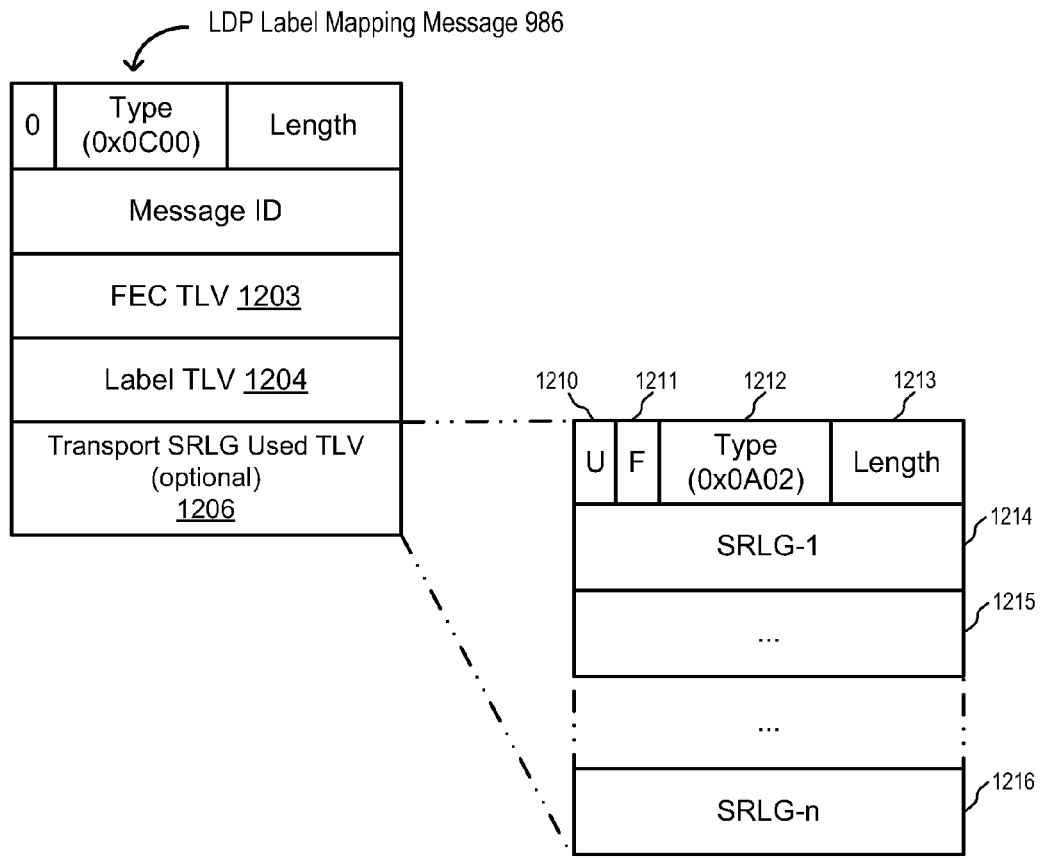
FIG. 12 is a block diagram illustrating a LDP label mapping message according to one embodiment.

At transaction 1040, LDP control 313 binds the downstream path of the primary PW to downstream path 191. PE 111 advertises its PW label 195 by transmitting LDP label mapping message 986 over targeted LDP session 160. In one embodiment, LDP label mapping message 986 includes the TLVs as illustrated in FIG. 12, which is consistent with LDP RFC 3036. LDP label mapping message 986, however, may include additional Transport SRLG Used TLV 1206. The definitions of each field (except for Transport SRLG Used TLV 1206) are provided in draft-ietf-pwe3-control-protocol-17. In particular, FEC TLV 1203 includes the PW ID, which in this example, is PW ID 180. Label TLV 1204 includes the PW label, which in this example is PW label 195.

In one embodiment, Transport SRLG Used TLV 1206 includes U field 1210 (1 bit), F field 1211 (1 bit), Type field 1212 (14 bits), Length field 1213 (16 bits), and one or more SRLG fields 1214-1216. In one embodiment, U/F fields 1210-1211 are set to "0/0" to indicate the behavior as described in RFC 3036. In one embodiment, Type field 1212 is set to 0x0A02. Length field 1213 is set to the value of the length of Transport SRLG Used TLV 1206. In one embodiment, SRLGs 1214-1216 is a list of one or more SRLGs that PE 111 used to establish a downstream RSVP-TE LSP that are not the same as SRLGs 1114-1116 of LDP label mapping message 983. In the example illustrated in FIG. 9, PE 111 uses SRLGs 1114-1116 for establishing downstream path 191. Thus, LDP label mapping message 986 does not include optional Transport SRLG Used TLV 1206. FIG. 12 illustrates LDP label mapping message 986 only for illustrative purpose and not as a limitation. For example, although SRLGs 1214-1216 are included in Transport SRLG Used TLV 1206, it will be appreciated that more or less SRLGs may be included. At this point, the primary PW is established in which the MPLS transport path includes upstream path 190 and downstream path 191.

Next, PE 110 establishes the transport path for the redundant PW. At transaction 1045, PE 110 determines a second upstream path of a second upstream unidirectional RSVP-TE LSP to PE 111. PE 110 ensures that the redundant PW uses a transport path that is disjoint from the primary PW by passing the SRLGs used by the primary PW to CSPF 211 as an exclude list (e.g., SRLGs 1114-1116 and optional SRLGs 1214-1216). In the example illustrated in FIG. 9, RSVP-TE control 212 passes SRLGs 150-152 to CSPF 211. In response, CSPF 211 returns the IP addresses for the second upstream path to PE 111. In this example, CSPF 211 returns IP addresses 176, 177, and 174, which have been assigned to P 122, P 123, and PE 111, respectively.

At transaction 1050, RSVP-TE control 212 generates RSVP-TE path message 987 and transmits it to PE 111 over targeted RSVP-TE session 160. In one embodiment, RSVP-TE path message 987 includes IP addresses 176, 177, and 174 which have been assigned to P 122, P 123, and PE 111, respectively. At transaction 1055, in response to receiving RSVP-TE path message 987, RSVP-TE control 312 generates RSVP-TE resv message 988 and transmits it to PE 110. RSVP-TE resv message 988 includes label 143 which identifies the upstream physical link coupling PE 111 and the next hop (i.e., P 123). As RSVP-TE resv message 988 propagates through each hop, labels are inserted into the message. For example, P 123 inserts label 144 (which identifies the upstream physical link coupling P 123 and its next hop P 122), and P 122 inserts label 145 (which identifies the upstream physical link coupling P 122 and its next hop, PE 110). At this point, the second upstream unidirectional RSVP-TE LSP 190 is established.

At transaction 1060, LDP control 213 binds the upstream path of the redundant PW to upstream path 192. PE 110 advertises its PW label 194 by transmitting LDP label mapping message 989 over targeted LDP session 160. LDP label mapping message 989 also serves as a request for PE 111 to establish a downstream RSVP-TE LSP and bind it to the downstream path of the redundant PW. Conventionally, a LDP label mapping message from an ingress/hub router only binds the upstream path of the primary PW to an upstream RSVP-TE LSP (e.g., upstream path 192). In a conventional PW set up, PE 110 does not have any control over which downstream LSP is used by PE 111 for the downstream path of the redundant PW. This is problematic because it prevents a hub router (such as PE 110) from establishing primary and redundant PWs that use disjoint LSPs since the hub router does not have control over which LSP is used by the egress router (such as PE 111).

Figure 13:
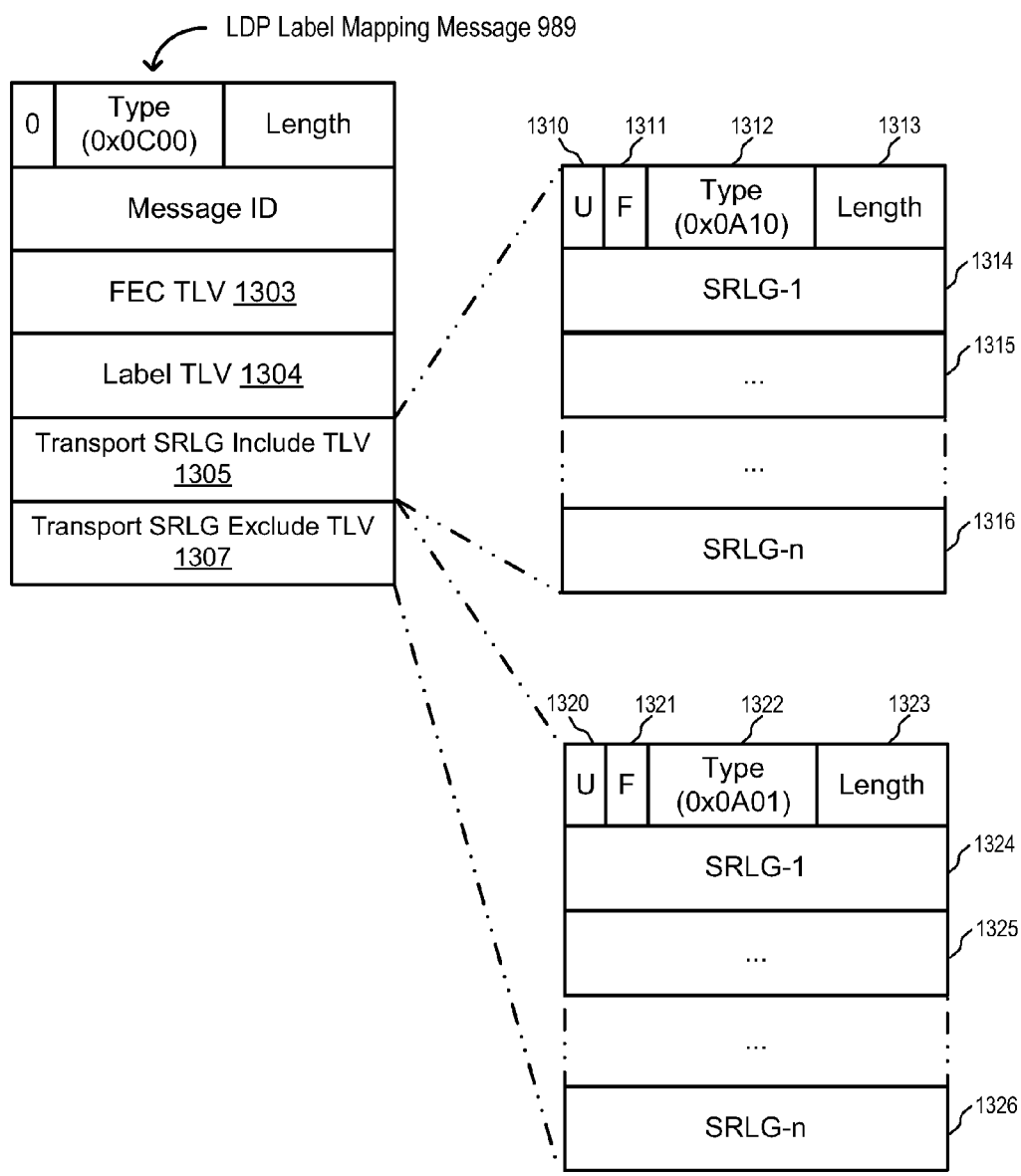
FIG. 13 is a block diagram illustrating a LDP label mapping message according to one embodiment.

In one embodiment, LDP label mapping message 989 includes a Transport SRLG Include TLV to overcome the above limitation associated with the conventional LDP label mapping message. In one embodiment, LDP label mapping message 989 includes the TLVs as illustrated in FIG. 13, which is consistent with LDP RFC 3036. LDP label mapping message 989, however, includes additional Transport SRLG Include TLV 1305 and Transport SRLG Exclude TLV 1307. The definitions of each field (except for Transport SRLG Include TLV 1305 and Transport SRLG Exclude TLV 1307) are provided in draft-ietf-pwe3-control-protocol-17. In particular, FEC TLV 1303 includes the PW ID, which in this example, is PW ID 180. Label TLV 1304 includes the PW label, which in this example is PW label 194.

In one embodiment, Transport SRLG Include TLV 1305 includes U field 1310 (1 bit), F field 1311 (1 bit), Type field 1312 (14 bits), Length field 1313 (16 bits), and one or more SRLG fields 1314-1316. In one embodiment, U/F fields 1310-1311 are set to "0/0" to indicate the behavior as described in RFC 3036. In one embodiment, Type field 1312 is set to 0x0A10. Length field 1313 is set to the value of the length of Transport SRLG Include TLV 1305. In one embodiment, SRLGs 1314-1316 is a list of one or more SRLGs that PE 110 would like PE 111 to use for establishing the downstream unidirectional RSVP-TE LSP. In one embodiment, SRLGs 1314-1316 are the SRLGs that are used in the corresponding upstream unidirectional RSVP-TE LSP such as upstream path 192 (i.e., SRLGs 155-157). For example, control processor 205 provides CSPF 211 with the IP addresses of upstream path 192 (i.e., IP addresses 176, 177, and 174). CSPF 211, in response, returns the SRLGs that the IP addresses belong to (i.e., SRLGs 155-157). FIG. 13 illustrates LDP label mapping message 989 only for illustrative purpose and not as a limitation. For example, although SRLGs 1314-1316 are included in Transport SRLG Include TLV 1305, it will be appreciated that more or less SRLGs may be included. In one embodiment, Transport SRLG Include TLV 1305 serves as a request for PE 111 to establish a corresponding downstream RSVP-TE LSP using the same SRLGs as those included in Transport SRLG Include TLV 1305.

In one embodiment, LDP label mapping message 989 includes Transport SRLG Exclude TLV 1307. In one embodiment, Transport SRLG Exclude TLV 1307 includes U field 1320 (1 bit), F field 1321 (1 bit), Type field 1322 (14 bits), Length field 1323 (16 bits), and one or more SRLG fields 1324-1326. In one embodiment, U/F fields 1320-1321 are set to "0/0" to indicate the behavior as described in RFC 3036. In one embodiment, Type field 1322 is set to 0x0A01. Length field 1323 is set to the value of the length of Transport SRLG Exclude TLV 1307. In one embodiment, SRLGs 1324-1326 is a list of one or more SRLGs that PE 111 is not allowed to use for establishing the downstream path for the redundant PW. In one embodiment, SRLGs 1324-1326 are the SRLGs used by the primary PW (e.g., SRLGs 150-152).

Referring now back to FIG. 10, at transaction 1065, in response to receiving Transport SRLG Include TLV 1305, PE 111 determines a second downstream unidirectional RSVP-TE LSP path to PE 110. RSVP-TE control 312 passes the SRLGs included in Transport SRLG Include TLV 1305 of LDP label mapping message 989 to CSPF 311. In one embodiment, CSPF 311 returns IP addresses that belong to the SRLGs included in Transport SRLG Include TLV 1305. In another embodiment, CSPF 311 returns one or more IP addresses that do not belong to the SRLGs included in Transport SRLG Include TLV 1305. CSPF 311, however, is not allowed to return any IP addresses that belong to SRLGs 1324-1326 of LDP label mapping message 989. In the example illustrated in FIG. 9, CSPF 311 returns IP addresses 177, 176, and 171, which have been assigned to P 123, P 122, and PE 110, respectively. IP addresses 177, 176, and 171 make up downstream path 193.

At transaction 1070, RSVP-TE control 312 generates RSVP-TE path message 990 and transmits it to PE 110 over targeted RSVP-TE session 160. In one embodiment, RSVP-TE path message 990 includes IP addresses generated by CSPF 311 at transaction 1065 (e.g., IP addresses 177, 176, and 171, which have been assigned to P 123, P 122, and PE 110, respectively).

At transaction 1075, in response to receiving RSVP-TE path message 990, RSVP-TE control 212 generates RSVP-TE resv message 991 and transmits it to PE 111. RSVP-TE resv message 991 includes label 140 which identifies the downstream physical link coupling PE 110 and the next hop (i.e., P 122). As RSVP-TE resv message 991 propagates through each hop, labels are inserted into the message. For example, P 122 inserts label 141 (which identifies the downstream physical link coupling P 122 and its next hop P 123), and P 123 inserts label 142 (which identifies the downstream physical link coupling P 123 and its next hop, PE 111). At this point, a second downstream unidirectional RSVP-TE LSP is established, which includes downstream path 193.

Figure 14:
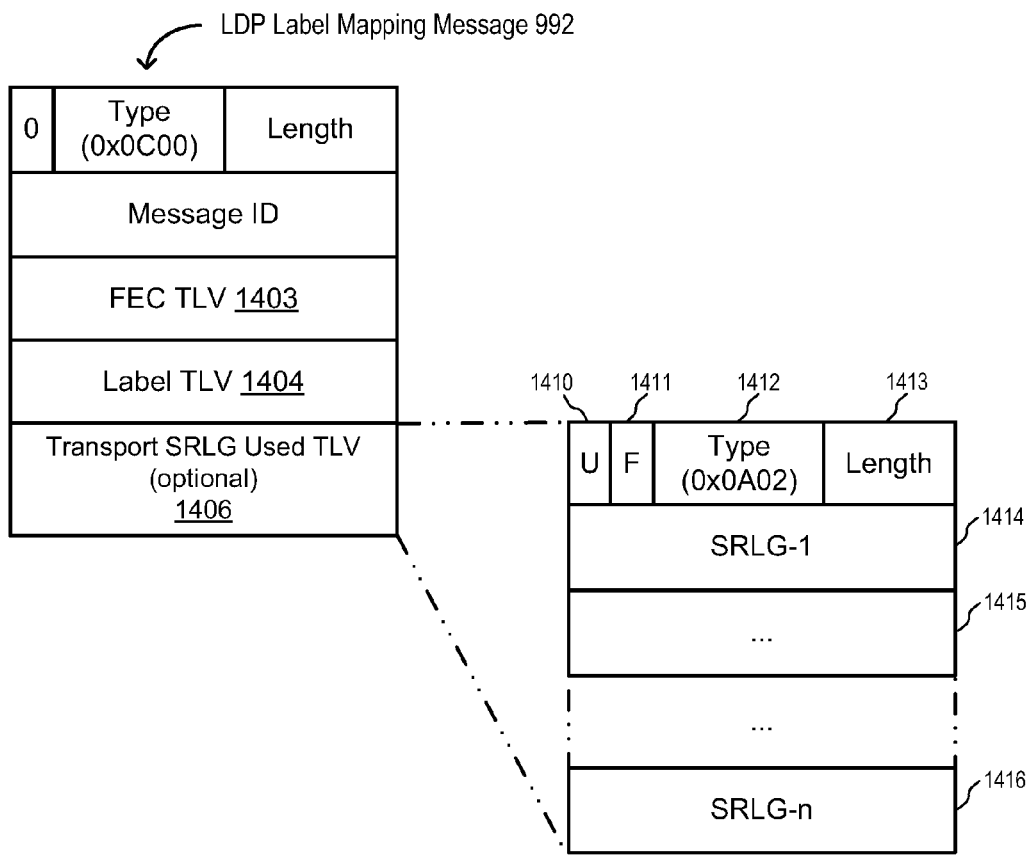
FIG. 14 is a block diagram illustrating a LDP label mapping message according to one embodiment.

At transaction 1080, LDP control 313 binds the downstream path of the redundant PW to downstream path 193. PE 111 advertises its PW label 195 by transmitting LDP label mapping message 992 over targeted LDP session 160. In one embodiment, LDP label mapping message 992 includes an optional Transport SRLG Used TLV as illustrated in FIG. 14, which is consistent with LDP RFC 3036. LDP label mapping message 992, however, includes additional Transport SRLG Used TLV 1406. The definitions of each field (except for Transport SRLG Used TLV 1406) are provided in draft-ietf-pwe3-control-protocol-17. In particular, FEC TLV 1403 includes the PW ID, which in this example, is PW ID 180. Label TLV 1404 includes the PW label, which in this example is PW label 195.

In one embodiment, Transport SRLG Used TLV 1406 includes U field 1410 (1 bit), F field 1411 (1 bit), Type field 1412 (14 bits), Length field 1413 (16 bits), and one or more SRLG fields 1414-1416. In one embodiment, U/F fields 1410-1411 are set to "0/0" to indicate the behavior as described in RFC 3036. In one embodiment, Type field 1412 is set to 0x0A02. Length field 1413 is set to the value of the length of Transport SRLG Used TLV 1406. In one embodiment, SRLGs 1414-1416 is a list of one or more SRLGs that PE 111 used to establish a downstream RSVP-TE LSP that are not the same as SRLGs 1314-1316 of LDP label mapping message 989. In the example illustrated in FIG. 9, PE 111 uses the SRLGs 1314-1316 for establishing downstream path 199. Thus, LDP label mapping message 992 does not include optional Transport SRLG Used TLV 1406. FIG. 14 illustrates LDP label mapping message 992 only for illustrative purpose and not as a limitation. For example, although SRLGs 1414-1416 are included in Transport SRLG Used TLV 1406, it will be appreciated that more or less SRLGs may be included. At this point, the primary PW is established in which the MPLS transport path includes upstream path 192 and downstream 193.

Figure 15:
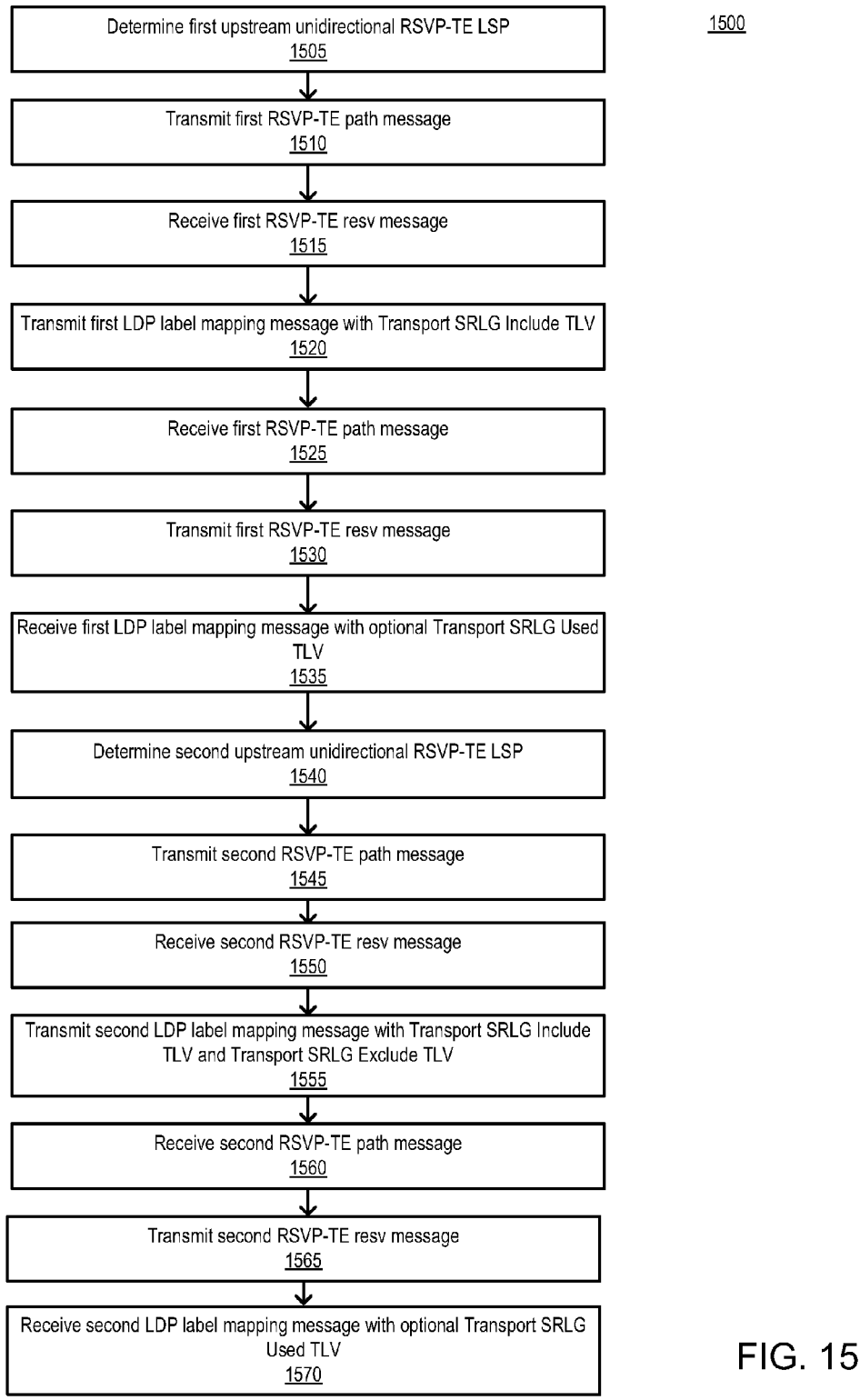
FIG. 15 is a flow diagram illustrating a method for establishing a primary and redundant PW over disjoint unidirectional RSVP-TE LSPs according to one embodiment.

FIG. 15 is a flow diagram illustrating method 1500 for establishing a primary and redundant PW over disjoint unidirectional RSVP-TE LSPs according to one embodiment. For example, method 1500 can be performed by PE 110. Method 1500 can be implemented in software, firmware, hardware, or any combination thereof. Method 1500 will be discussed with reference to FIGS. 9 and 10. Referring now to FIG. 15, at block 1505, PE 110 determines a first upstream unidirectional RSVP-TE LSP. For example, PE 110 performs the steps similar to those at transaction 1005.

At block 1510, PE 110 transmits a first RSVP-TE path message. For example, PE 110 transmits RSVP-TE path message 981 to PE 111 over RSVP-TE session 161. At block 1515, PE 110 receives a first RSVP-TE resv message. For example, PE 110 receives RSVP-TE resv message 982 from PE 111 over RSVP-TE session 161. At block 1520, PE 110 transmits a first LDP label mapping message with a Transport SRLG Include TLV. For example, PE 110 transmits LDP label mapping message 983 to PE 111 over targeted LDP session 160.

At block 1525, PE 110 receives a first RSVP-TE path message. For example, PE 110 receives RSVP-TE path message 984 from PE 111 over RSVP-TE session 161. At block 1530, PE 110 transmits a first RSVP-TE resv message. For example, PE 110 transmit RSVP-TE resv message 985 to PE 111 over RSVP-TE session 161. At block 1530, PE 110 receives a first LDP label mapping message with an optional Transport SRLG Used TLV. For example, PE 110 receives LDP label mapping message 986 from PE 111 over RSVP-TE session 161.

At block 1540, PE 110 determines a second upstream unidirectional RSVP-TE LSP. For example, PE 110 performs the steps similar to those at transaction 1045. At block 1545, PE 110 transmits a second RSVP-TE path message. For example, PE 110 transmits RSVP-TE path message 987 to PE 111 over RSVP-TE session 161. At block 1550, PE 110 receives a second RSVP-TE resv message. For example, PE 110 receives RSVP-TE resv message 988 from PE 111 over RSVP-TE session 161.

At block 1555, PE 110 transmits a second LDP label mapping message with a Transport SRLG Include TLV and a Transport SRLG Exclude TLV. For example, PE 110 transmits LDP label mapping message 989 to PE 111 over targeted LDP session 160. At block 1560, PE 110 receives a second RSVP-TE path message. For example, PE 110 receives RSVP-TE path message 990 from PE 111 over RSVP-TE session 161. At block 1565, PE 110 transmits a second RSVP-TE resv message. For example, PE 110 transmits RSVP-TE resv message 991 to PE 111 over RSVP-TE session 161. At block 1570, PE 110 receives a second LDP label mapping message with an optional Transport SRLG Used TLV. For example, PE 110 receives LDP label mapping message 992 from PE 111 over targeted LDP session 160.

Figure 16:
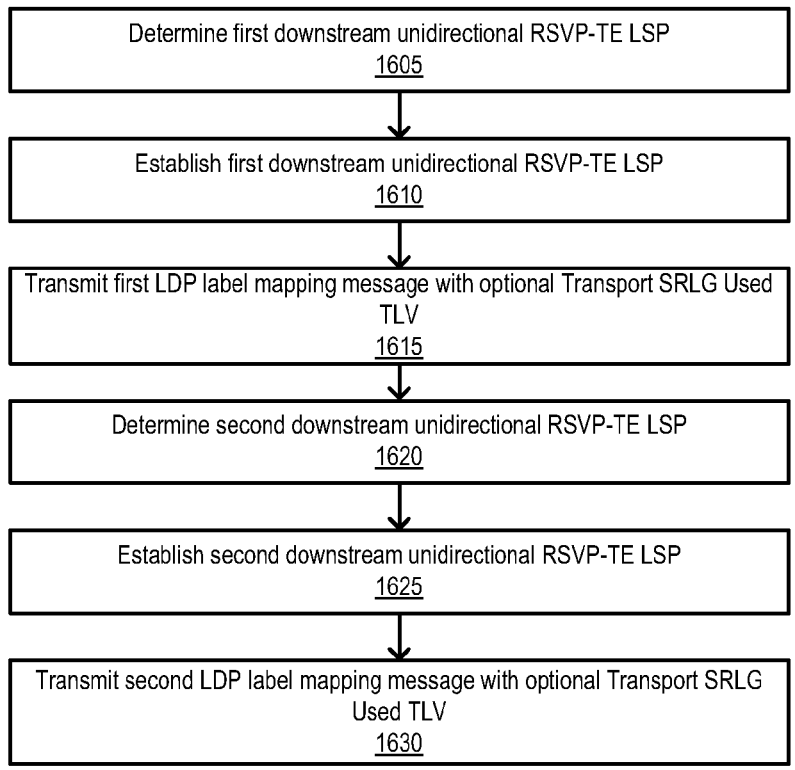
FIG. 16 is a flow diagram illustrating a method for establishing a primary and redundant PW over disjoint unidirectional RSVP-TE LSPs according to one embodiment.

FIG. 16 is a flow diagram illustrating method 1600 for establishing a primary and redundant PW over disjoint unidirectional RSVP-TE LSPs according to one embodiment. For example, method 1600 can be performed by PE 111. Method 1600 can be implemented in software, firmware, hardware, or any combination thereof. Method 1600 will be discussed with reference to FIGS. 9 and 10.

Referring now to FIG. 16. At block 1605, PE 111 determines a first downstream unidirectional RSVP-TE path. For example, in response to receiving LDP label mapping message 983 from PE 110, PE 111 performs the steps similar to those at transaction 1025. At block 1610, PE 110 establishes the first downstream unidirectional RSVP-TE LSP, e.g., by transmitting RSVP-TE path message 984 to PE 110 over RSVP-TE session 161. At block 1615, PE 111 transmits a first LDP label mapping message with an optional Transport SRLG Used TLV. For example, in response to receiving RSVP-TE resv message 985 from PE 110, PE 111 transmits LDP label mapping message 986 with optional Transport SRLG Used TLV 1206 as part of transaction 1040.

At block 1620, PE 111 determines a second downstream unidirectional RSVP-TE LSP. For example, in response to receiving LDP label mapping message 989 from PE 110, PE 111 performs the steps similar to those at transaction 1065. At block 1625, PE 111 establishes a second downstream unidirectional RSVP-TE LSP, e.g., by transmitting RSVP-TE path message 990 to PE 110 over RSVP-TE session 161. At block 1630, PE 111 transmits a second LDP label mapping message with an optional Transport SRLG Used TLV. For example, in response to receiving RSVP-TE resv message 991 from PE 110, PE 111 transmits LDP label mapping message 992 with optional Transport SRLG Used TLV 1406.

Figure 17:
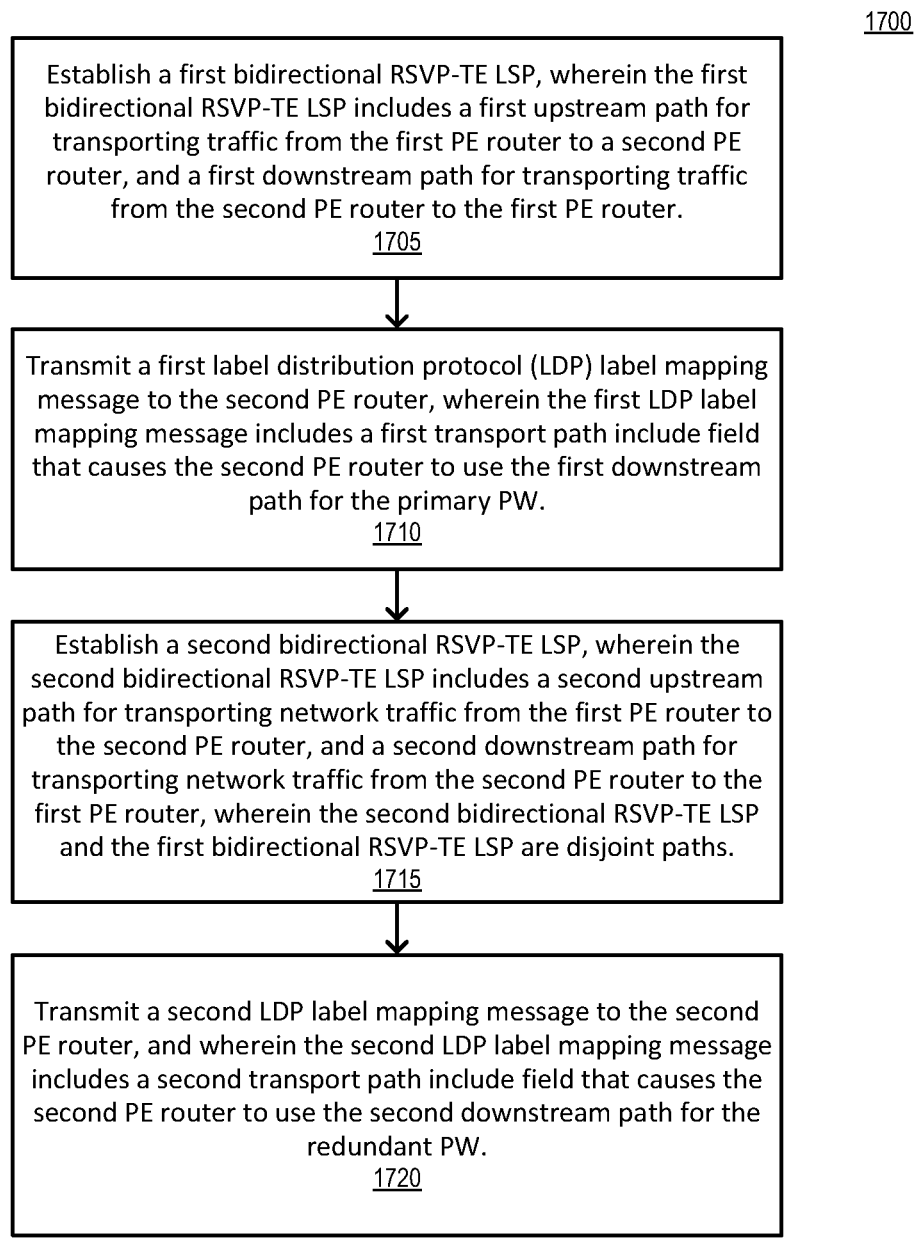
FIG. 17 is a flow diagram illustrating a method for establishing a primary and redundant PW over disjoint bidirectional RSVP-TE LSPs according to one embodiment.

FIG. 17 is a flow diagram illustrating method 1700 for establishing a primary and redundant PW over disjoint bidirectional RSVP-TE LSPs according to one embodiment. For example, method 1700 can be performed by PE 110. Method 1700 can be implemented as software, firmware, hardware, or any combination thereof.

At block 1705, PE 110 establishes a first bidirectional RSVP-TE LSP, wherein the first bidirectional RSVP-TE LSP includes a first upstream path (e.g., upstream path 190) for transporting traffic from a first PE router (i.e., PE 110) to a second PE router (e.g., PE 111), and a first downstream path (e.g., downstream path 191) for transporting traffic from the second PE router to the first PE router.

At block 1710, PE 110 transmits a first label distribution protocol (LDP) label mapping message (e.g., LDP label mapping message 183) to the second PE router, wherein the first LDP label mapping message includes a first Transport Path Include field (e.g., Transport Path Include TLV 505) that causes the second PE router to use the first downstream path for the primary PW.

At block 1715, PE 110 establishes a second bidirectional RSVP-TE LSP, wherein the second bidirectional RSVP-TE LSP includes a second upstream path (192) for transporting network traffic from the first PE router to the second PE router, and a second downstream path (193) for transporting network traffic from the second PE router to the first PE router, wherein the second bidirectional RSVP-TE LSP and the first bidirectional RSVP-TE LSP are disjoint MPLS transport paths.

At block 1720, PE 110 transmits a second LDP label mapping message (e.g., LDP label mapping message 187) to the second PE router, and wherein the second LDP label mapping message includes a second transport path include field (e.g., Transport Path Include TLV 605) that causes the second PE router to use the second downstream path for the redundant PW.

Figure 18:
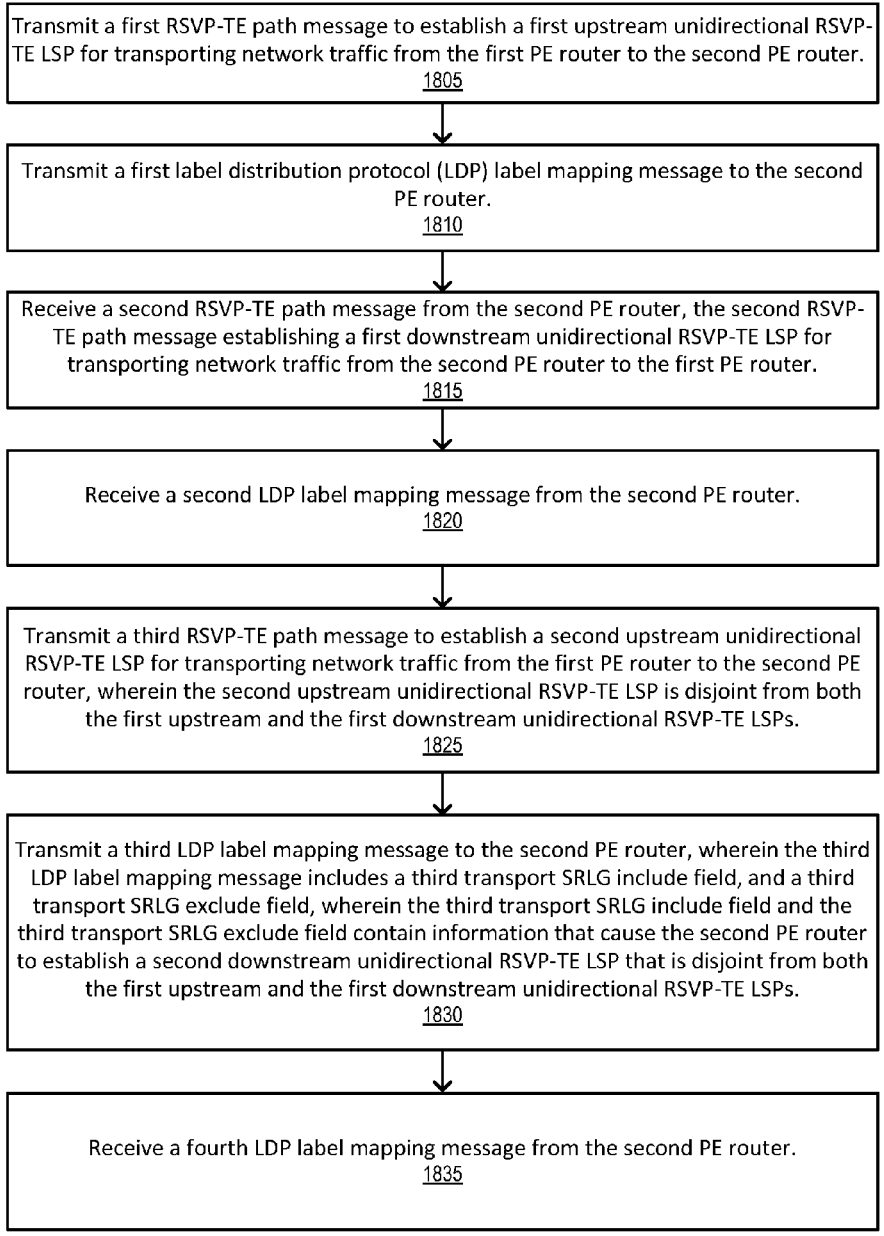
FIG. 18 is a flow diagram illustrating a method for establishing a primary and redundant PW over disjoint unidirectional RSVP-TE LSPs according to one embodiment.

FIG. 18 is a flow diagram illustrating method 1800 for establishing a primary and redundant PW over disjoint unidirectional RSVP-TE LSPs according to one embodiment. For example, method 1800 can be performed by PE 110. Method 1800 can be implemented as software, firmware, hardware, or any combination thereof.

At block 1805, PE 110 transmits a first RSVP-TE path message (e.g., RSVP-TE path message 981) to establish a first upstream unidirectional RSVP-TE LSP (e.g., upstream path 190) for transporting network traffic from the first PE router (i.e., PE 110) to a second PE router (e.g., PE 111). At block 1810, PE 110 transmits a first label distribution protocol (LDP) label mapping message (e.g., LDP label mapping message 983) to the second PE router.

At block 1815, PE 110 receives a second RSVP-TE path message (e.g., RSVP-TE path message 984) from the second PE router, the second RSVP-TE path message establishing a first downstream unidirectional RSVP-TE LSP (e.g., downstream path 191) for transporting network traffic from the second PE router to the first PE router. At block 1820, PE 110 receives a second LDP label mapping message (e.g., LDP label mapping message 986) from the second PE router.

At block 1820, PE 110 transmits a third RSVP-TE path message (e.g., RSVP-TE path message 987) to establish a second upstream unidirectional RSVP-TE LSP (e.g., upstream path 192) for transporting network traffic from the first PE router to the second PE router, wherein the second upstream unidirectional RSVP-TE LSP is disjoint from both the first upstream and the first downstream unidirectional RSVP-TE LSPs.

At block 1825, PE 110 transmits a third LDP label mapping message (e.g., LDP label mapping message 989) to the second PE router, wherein the third LDP label mapping message includes a third transport SRLG include field (e.g., Transport SRLG Include TLV 1305), and a third transport SRLG exclude field (e.g., Transport SRLG Exclude TLV 1307), wherein the third transport SRLG include field and the third transport SRLG exclude field contain information that cause the second PE router to establish a second downstream unidirectional RSVP-TE LSP that is disjoint from both the first upstream and the first downstream unidirectional RSVP-TE LSPs.

An electronic device (e.g., an end station, a network device) stores and transmits (internally and/or with other electronic devices over a network) code (composed of software instructions) and data using machine-readable media, such as non-transitory machine-readable media (e.g., machine-readable storage media such as magnetic disks; optical disks; read only memory; flash memory devices; phase change memory) and transitory machine-readable transmission media (e.g., electrical, optical, acoustical or other form of propagated signals—such as carrier waves, infrared signals). In addition, such electronic devices include hardware, such as a set of one or more processors coupled to one or more other components—e.g., one or more non-transitory machine-readable storage media (to store code and/or data) and network connections (to transmit code and/or data using propagating signals), as well as user input/output devices (e.g., a keyboard, a touchscreen, and/or a display) in some cases. The coupling of the set of processors and other components is typically through one or more interconnects within the electronic devices (e.g., busses and possibly bridges). Thus, a non-transitory machine-readable medium of a given electronic device typically stores instructions for execution on one or more processors of that electronic device. One or more parts of an embodiment of the invention may be implemented using different combinations of software, firmware, and/or hardware.

Some portions of the preceding detailed descriptions have been presented in terms of algorithms and symbolic representations of transactions on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of transactions leading to a desired result. The transactions are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general-purpose systems may be used with programs in accordance with the teachings herein, or it may prove convenient to construct more specialized apparatus to perform the required method transactions. The required structure for a variety of these systems will appear from the description above. In addition, embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

Throughout the description, embodiments of the present invention have been presented through flow diagrams. It will be appreciated that the order of transactions and transactions described in these flow diagrams are only intended for illustrative purposes and not intended as a limitation of the present invention. One having ordinary skill in the art would recognize that variations can be made to the flow diagrams without departing from the broader spirit and scope of the invention as set forth in the following claims.

What is claimed is:

1. A method in a first provider edge (PE) router in a multiprotocol label switching (MPLS) network, the MPLS network comprising the first PE router communicatively coupled to a second PE router, for providing a primary and a redundant pseudo wire (PW) between the first PE router and the second PE router, wherein the primary and the redundant PW use disjoint bidirectional reservation protocol traffic engineering (RSVP-TE) label-switched-paths (LSPs), the method comprising:

establishing a first bidirectional RSVP-TE LSP, wherein the first bidirectional RSVP-TE LSP includes a first upstream path for transporting traffic from the first PE router to the second PE router, and a first downstream path for transporting traffic from the second PE router to the first PE router;

transmitting a first label distribution protocol (LDP) label mapping message to the second PE router, wherein the first LDP label mapping message includes a first transport path include field that causes the second PE router to use the first downstream path for the primary PW;

establishing a second bidirectional RSVP-TE LSP, wherein the second bidirectional RSVP-TE LSP includes a second upstream path for transporting network traffic from the first PE router to the second PE router, and a second downstream path for transporting network traffic from the second PE router to the first PE router, wherein the second bidirectional RSVP-TE LSP and the first bidirectional RSVP-TE LSP are disjoint RSVP-TE LSPs; and transmitting a second LDP label mapping message to the second PE router, and wherein the second LDP label mapping message includes a second transport path include field that causes the second PE router to use the second downstream path for the redundant PW.

2. The method of claim 1, wherein the first transport path include field comprises a first tunnel endpoint address, a first tunnel identifier (ID), a first LSP ID, and a first extended tunnel ID, wherein the first tunnel endpoint address, the first tunnel identifier (ID), the first LSP ID, and the first extended tunnel ID uniquely identifies the first bidirectional RSVP-TE LSP.

3. The method of claim 1, wherein the second transport path include field comprises a second tunnel endpoint address, a second tunnel identifier (ID), a second LSP ID, and a second extended tunnel ID, wherein the second tunnel endpoint address, the second tunnel identifier (ID), the second LSP ID, and the second extended tunnel ID uniquely identifies the second bidirectional RSVP-TE LSP.

4. The method of claim 1, wherein establishing the first bidirectional RSVP-TE LSP comprises transmitting a first RSVP-TE path message and receiving a first RSVP-TE resv message.

5. The method of claim 1, wherein establishing the second bidirectional RSVP-TE LSP comprises transmitting a second RSVP-TE path message and receiving a second RSVP-TE resv message.

6. A first provider edge (PE) router in a multiprotocol label switching (MPLS) network, the MPLS network comprising the first PE router communicatively coupled to a second PE router, for providing a primary and a redundant pseudo wire (PW) between the first PE router and the second PE router, wherein the primary and the redundant PW use disjoint bidirectional reservation protocol traffic engineering (RSVP-TE) label-switched-paths (LSP), the first PE router comprising:

a network interface configured to transmit and receive network traffic;

a control processor coupled to the network interface, configured to execute a RSVP-TE control and a label distribution protocol (LDP) control, the RSVP-TE control and the LDP control to establish a first bidirectional RSVP-TE LSP, wherein the first bidirectional RSVP-TE LSP includes a first upstream path for transporting traffic from the first PE router to the second PE router, and a first downstream path for transporting traffic from the second PE router to the first PE router, transmit a first label distribution protocol (LDP) label mapping message to the second PE router, wherein the first LDP label mapping message includes a first transport path include field that causes the second PE router to use the first downstream path for the primary PW, establish a second bidirectional RSVP-TE LSP, wherein the second bidirectional RSVP-TE LSP includes a second upstream path for transporting network traffic from the first PE router to the second PE router, and a second downstream path for transporting network traffic from the second PE router to the first PE router, wherein the first bidirectional RSVP-TE LSP and the second bidirectional RSVP-TE LSP are disjoint RSVP-TE LSPs, and transmit a second LDP label mapping message to the second PE router, and wherein the second LDP label mapping message includes a second transport path include field that causes the second PE router to use the second downstream path for the redundant PW.

7. The first PE router of claim 6, wherein the first transport path include field comprises a first tunnel endpoint address, a first tunnel identifier (ID), a first LSP ID, and a first extended tunnel ID, wherein the first tunnel endpoint address, the first tunnel identifier (ID), the first LSP ID, and the first extended tunnel ID uniquely identifies the first bidirectional RSVP-TE LSP.

8. The first PE router of claim 6, wherein the second transport path include field comprises a second tunnel endpoint address, a second tunnel identifier (ID), a second LSP ID, and a second extended tunnel ID, wherein the second tunnel endpoint address, the second tunnel identifier (ID), the second LSP ID, and the second extended tunnel ID uniquely identifies the second bidirectional RSVP-TE LSP.

9. The first PE router of claim 6, wherein establishing the first bidirectional RSVP-TE LSP comprises transmitting a first RSVP-TE path message and receiving a first RSVP-TE resv message.

10. The first PE router of claim 6, wherein establishing the second bidirectional RSVP-TE LSP comprises transmitting a second RSVP-TE path message and receiving a second RSVP-TE resv message.

11. A method in a first provider edge (PE) router in a multiprotocol label switching (MPLS) network, the MPLS network comprising the first PE router communicatively coupled to a plurality of provider routers via a first set of one or more physical links, the plurality of provider routers communicatively coupled to a second PE router via a second set of physical links, wherein physical links that couple a same set of two routers belong to a shared risk link group (SRLG), for providing a primary and a redundant pseudo wire (PW) between the first PE router and the second PE router, wherein the primary and the redundant PW use disjoint unidirectional reservation protocol traffic engineering (RSVP-TE) label-switched-paths (LSPs), the method comprising:

transmitting a first RSVP-TE path message to establish a first upstream unidirectional RSVP-TE LSP for transporting network traffic from the first PE router to the second PE router;

transmitting a first label distribution protocol (LDP) label mapping message to the second PE router;

receiving a second RSVP-TE path message from the second PE router, the second RSVP-TE path message establishing a first downstream unidirectional RSVP-TE LSP for transporting network traffic from the second PE router to the first PE router;

receiving a second LDP label mapping message from the second PE router;

transmitting a third RSVP-TE path message to establish a second upstream unidirectional RSVP-TE LSP for transporting network traffic from the first PE router to the second PE router, wherein the second upstream unidirectional RSVP-TE LSP is disjoint from both the first upstream and the first downstream unidirectional RSVP-TE LSPs;

transmitting a third LDP label mapping message to the second PE router, wherein the third LDP label mapping message includes a third transport SRLG include field, and a third transport SRLG exclude field, wherein the third transport SRLG include field and the third transport SRLG exclude field contain information that cause the second PE router to establish a second downstream unidirectional RSVP-TE LSP that is disjoint from both the first upstream and the first downstream unidirectional RSVP-TE LSPs; and receiving a fourth LDP label mapping message from the second PE router.

12. The method of claim 11, wherein the first LDP label mapping message includes a first transport SRLG include field, wherein the first transport SRLG include field includes SRLGs that are used in the first upstream unidirectional RSVP-TE LSP, the first transport SRLG include field serving as a request for the second PE router to use the same SRLGs to establish the first downstream unidirectional RSVP-TE LSP.

13. The method of claim 11, wherein the second LDP label mapping message includes a second transport SRLG used field, the second transport SRLG used field includes one or more SRLGs used by the first downstream unidirectional RSTV-TE LSP that are not included in the first transport SRLG include field.

14. The method of claim 11, wherein the third transport SRLG include field includes one or more SRLGs that are used in the second upstream unidirectional RSVP-TE LSP, the third transport SRLG include field serving as a request for the second PE router to use the same SRLGs to establish the second downstream unidirectional RSVP-TE LSP.

15. The method of claim 11, wherein the third transport SRLG exclude field includes one or more SRLGs that the second PE router must not use in the second downstream unidirectional RSVP-TE LSP.

16. The method of claim 15, wherein the one or more SRLGs in the third transport SRLG exclude field is determined based on SRLGs used in the first upstream and first downstream unidirectional RSVP-TE LSPs.

17. A first provider edge (PE) router in a multiprotocol label switching (MPLS) network, the MPLS network comprising the first PE router communicatively coupled to a plurality of provider routers via a first set of one or more physical links, the plurality of provider routers communicatively coupled to a second PE router via a second set of physical links, wherein physical links that couple a same set of two routers belong to a shared risk link group (SRLG), for providing a primary and a redundant pseudo wire (PW) between the first PE router and the second PE router, wherein the primary and the redundant PW use disjoint unidirectional reservation protocol traffic engineering (RSVP-TE) label-switched-path (LSP) paths, the first PE router comprising:

a network interface configured to transmit and receive network traffic;

a control processor coupled to the network interface, configured to execute a RSVP-TE control and a label distribution protocol (LDP) control, the RSVP-TE control and the LDP control to transmitting a first RSVP-TE path message to establish a first upstream unidirectional RSVP-TE LSP for transporting network traffic from the first PE router to the second PE router, receive a second RSVP-TE path message from the second PE router, the second RSVP-TE path message establishing a first downstream unidirectional RSVP-TE LSP for transporting network traffic from the second PE router to the first PE router, transmit a first label distribution protocol (LDP) label mapping message to the second PE router, receive a second LDP label mapping message from the second PE router, transmit a third RSVP-TE path message to establish a second upstream unidirectional RSVP-TE LSP for transporting network traffic from the first PE router to the second PE router, wherein the second upstream unidirectional RSVP-TE LSP is disjoint from both the first upstream and the first downstream unidirectional RSVP-TE LSPs, transmit a third LDP label mapping message to the second PE router, wherein the third LDP label mapping message includes a third transport SRLG include field, and a third transport SRLG exclude field, wherein the third transport SRLG include field and the third transport SRLG exclude field contain information that cause the second PE router to establish a second downstream unidirectional RSVP-TE LSP that is disjoint from both the first upstream and the first downstream unidirectional RSVP-TE LSPs, and receive a fourth LDP label mapping message from the second PE router.

18. The first PE router of claim 17, wherein the first LDP label mapping message includes a first transport SRLG include field, wherein the first transport SRLG include field includes SRLGs that are used in the first upstream unidirectional RSVP-TE LSP, the first transport SRLG include field serving as a request for the second PE router to use the same SRLGs to establish the first downstream unidirectional RSVP-TE LSP.

19. The first PE router of claim 17, wherein the second LDP label mapping message includes a second transport SRLG used field, the second transport SRLG used field includes one or more SRLGs used by the first downstream unidirectional RSTV-TE LSP that are not included in the first transport SRLG include field.

20. The first PE router of claim 17, wherein the third transport SRLG include field includes one or more SRLGs that are used in the second upstream unidirectional RSVP-TE LSP, the third transport SRLG include field serving as a request for the second PE router to use the same SRLGs to establish the second downstream unidirectional RSVP-TE LSP.

21. The first PE router of claim 17, wherein the third transport SRLG exclude field includes one or more SRLGs that the second PE router must not use in the second downstream unidirectional RSVP-TE LSP.

22. The first PE router of claim 21, wherein the one or more SRLGs in the third transport SRLG exclude field is determined based on SRLGs used in the first upstream and first downstream unidirectional RSVP-TE LSPs.

* * * * *